United States Patent
Wigren

(10) Patent No.: US 6,278,401 B1
(45) Date of Patent: Aug. 21, 2001

(54) TARGET TYPE ESTIMATION IN TARGET TRACKING

(75) Inventor: Torbjörn Wigren, Uppsala (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 09/424,772

(22) PCT Filed: May 20, 1998

(86) PCT No.: PCT/SE98/00956

§ 371 Date: Nov. 30, 1999

§ 102(e) Date: Nov. 30, 1999

(87) PCT Pub. No.: WO98/58274

PCT Pub. Date: Dec. 23, 1998

(30) Foreign Application Priority Data

Jun. 19, 1997 (SE) ................................................. 9702367

(51) Int. Cl.[7] ................................................. G01S 7/292
(52) U.S. Cl. .............................. 342/195; 342/90; 342/95; 342/96; 342/108; 342/113; 342/115; 342/140; 342/189
(58) Field of Search .................................. 342/59, 89, 90, 342/95, 96, 97, 108, 113, 115, 135, 140, 145, 162, 189, 195

(56) References Cited

U.S. PATENT DOCUMENTS

| | | | |
|---|---|---|---|
| 5,170,440 | * 12/1992 | Cox | 382/199 |
| 5,282,013 | 1/1994 | Gregoris | 356/4 |
| 5,317,319 | * 5/1994 | Fagarasan et al. | 342/53 |
| 5,355,325 | 10/1994 | Uhlmann | 364/516 |
| 5,365,236 | * 11/1994 | Fagarasan et al. | 342/53 |
| 5,390,133 | * 2/1995 | Sohie | 342/159 |
| 5,392,050 | 2/1995 | Guerci et al. | 342/90 |
| 5,392,225 | 2/1995 | Ward | 364/516 |
| 5,400,264 | * 3/1995 | Phillis et al. | 364/516 |
| 5,414,643 | 5/1995 | Blackman et al. | 364/516 |
| 5,469,374 | * 11/1995 | Graham et al. | 342/159 |
| 5,491,645 | 2/1996 | Kennedy et al. | 364/516 |
| 5,537,118 | 7/1996 | Appriou | 342/95 |
| 5,631,653 | * 5/1997 | Reedy | 342/62 |

FOREIGN PATENT DOCUMENTS 9838521  9/1998 (WO).

OTHER PUBLICATIONS

S. S. Blackman "Multiple–Target Tracking With Radar Applications", Artech House, MA, USA, 1986, pp. 249–300; pp. 368–391; pp. 397–401.

Y. Bar–Shalom and X. –R.Li, "Estimation and Tracking: Principles Techniques and Software", Artech House, MA, USA, 1993, Ch. 1 and pp. 382–399.

* cited by examiner

Primary Examiner—John B. Sotomayor
(74) Attorney, Agent, or Firm—Young & Thompson

(57) ABSTRACT

The present invention is in general related to target type estimation in target tracking systems. The invention enables a low complexity estimation of target type, using, e.g. ESM sensor data, by the introduction of an ambiguity restoring procedure in certain likelihood calculations. The invention further enables the systematic use of target type probability information in the calculation of strobe track crosses and their associated quality which is particularly useful for deghosting purposes. Methods for utilisation of target type probability information in the processes of strobe tracking, association, track quality evaluation and multiple hypothesis tracking are also disclosed.

43 Claims, 7 Drawing Sheets

TARGET TYPE ESTIMATION IN TARGET TRACKING

TECHNICAL FIELD OF THE INVENTION

The present invention relates in general to tracking of targets by means of measurements from various sensors and in particular to target type estimation by using discrete, target type related information.

PRIOR ART

In target tracking, data from sensors are used to determine a target track. This target track, or entities involved in the process of creating it, is associated with a certain target. It is useful if this target could be identified for supporting the classification, e.g. friendly aircraft against hostile ones, helping the operator of the tracking system to initiate relevant measures. The target type identification may use many types of different information, for instance, discrete information associated with e.g. ESM (Electronic Support Measures) data, IRST (Infra-Red Search and Track) measurements and direct target type observations. There exist many different types of targets that may need to be classified, which requires a method using efficient algorithms to reduce the computational needs.

Many multi target tracking systems of known art utilise algorithms which are based on a probabilistic approach, why it would be advantageous if extra functionality such as target type estimation would retain a probabilistic framework.

It is, e.g. from S. S. Blackman "Multiple-Target Tracking with Radar Applications", Artech House, MA, USA 1986, p. 368–380 known in prior art to use a Bayesian probabilistic framework for estimation of discrete quantities. Target type probabilities are suitable estimates, which are easily integrated within the probabilistic framework of the total multi target tracking system. Such methods have the disadvantages of requiring more and more data during the calculations when the measurement history grows, and this amount of data will eventually prohibit a real time treatment of the problem. Another disadvantage with the method is that it exhibits an inherent difficulty in treating ignorance or uncertainty.

It is further known to use e.g. the Dempsters-Shafer method (S.S. Blackman "Multiple-Target Tracking with Radar Applications", Artech House, MA, USA 1986, p. 380–391) in similar applications. One of the disadvantages with such methods is that the true probabilistic interpretation is lost. As a consequence, the integration of this type of method in a target tracking system of probabilistic type becomes troublesome.

Other approaches, such as neural networks and fuzzy logic are known in the art. However, these methods are not easily integrated with other parts of the probabilistically based tracking system.

In the U.S. Pat. No. 5,392,225 a method and apparatus for correlating target data is disclosed. This method is time static, i.e. uses only information from the last measurements. The method computes the likelihood for measurements from different sensors to originate from the same target. Disadvantages with this method is that neither filtering over time, nor correlation to tracks, is used, which significantly limits the degree of accuracy.

In the U.S. Pat. No. 5,392,050 a method of recognising the type of a radar target object is disclosed. This method uses a time-frequency analysis of the RCS (Radar Cross Section). The method is not applicable to e.g. passive sensors and discrete information sources.

In the U.S. Pat. No. 5,282,013 a passive ranging technique for infrared search and track systems is disclosed, in which a library of emission vs. contrast is available. By measuring the atmospheric background, a type match may be found, which eventually gives the target distance. Earlier distance estimates are also used in the calculations. However, this system is integrated in a special type of target tracking system and may not be used in a general manner.

SUMMARY OF THE INVENTION

An object of the present invention is to provide a method for target type estimation for target tracking purposes using discrete information, which method is possible to execute in real time and that is able to handle ambiguities and uncertainties Another object of the present invention is to provide a method for target type estimation using discrete information from different types of measurements.

Yet another object of the present invention is to provide a method for target type estimation which easily is integratable in a probabilistic framework for various target tracking purposes.

A further object of the present invention is to provide a method for calculation of crosses between strobe tracks including target type information and the quality of crosses, in target type space.

Still a further object of the present invention is to provide a method for multi-sensor multi-target tracking including target type information.

The object of the present invention is achieved by a process exhibiting the features set forth in the claims. The process of the invention uses time recursive Bayesian methods for calculating probabilities for different target types, using different types of discrete information, such as ESM data, IRST information and direct observations. In order to keep a low complexity in the calculation, approximations are introduced in the likelihood calculations, and an ambiguity restoring procedure is introduced for removing inherent abnormalities in Bayesian methods.

Target type estimates can be used during different stages in a target tracking process, e.g. in the strobe tracks and in the target tracks, particularly for improving the data to track association, cross calculations, cross quality calculations, track quality calculations and for supporting a MHT (Multiple Hypothesis Tracking) functionality. When crosses between strobe tracks are calculated, the target type information can improve the quality evaluation of the crosses, helping suppressing "ghost targets", i.e. false crosses. The inclusion of target type infor mation in the track state can also improve the data to track association. When the association of data to tracks is ambiguous, several alternative hypotheses may be retained and the decision postponed until further data become available, which MHT functionality can be improved if also target type information is available.

DRAWINGS

Some explanatory embodiments according to the present invention are presented in detail in the following, in connection with the associated drawing, in which.

Figure 7:
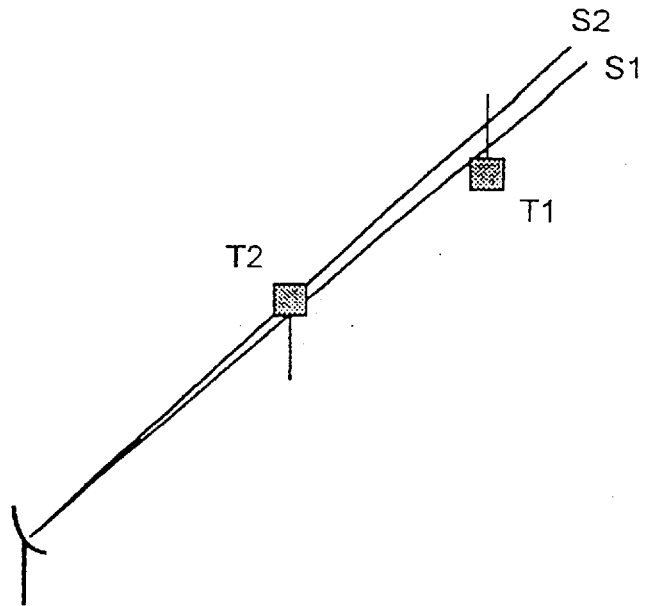
Figure 7:
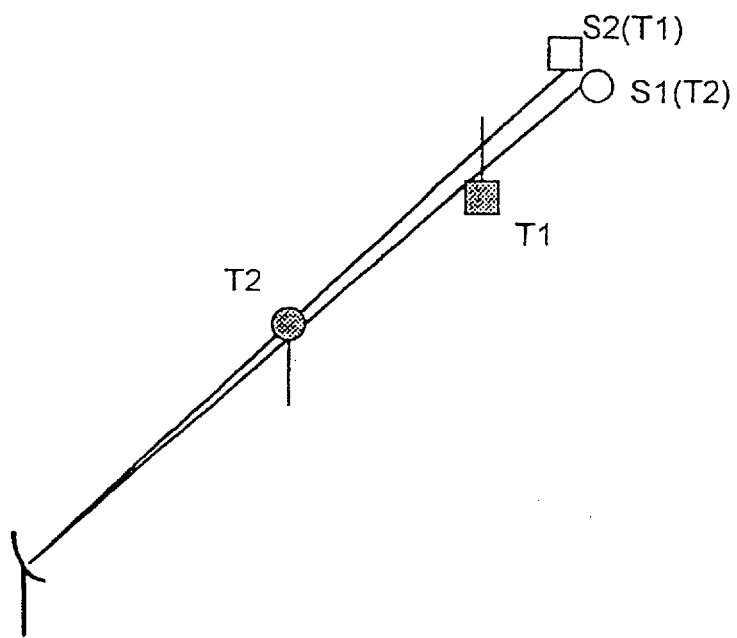
Figure 8:
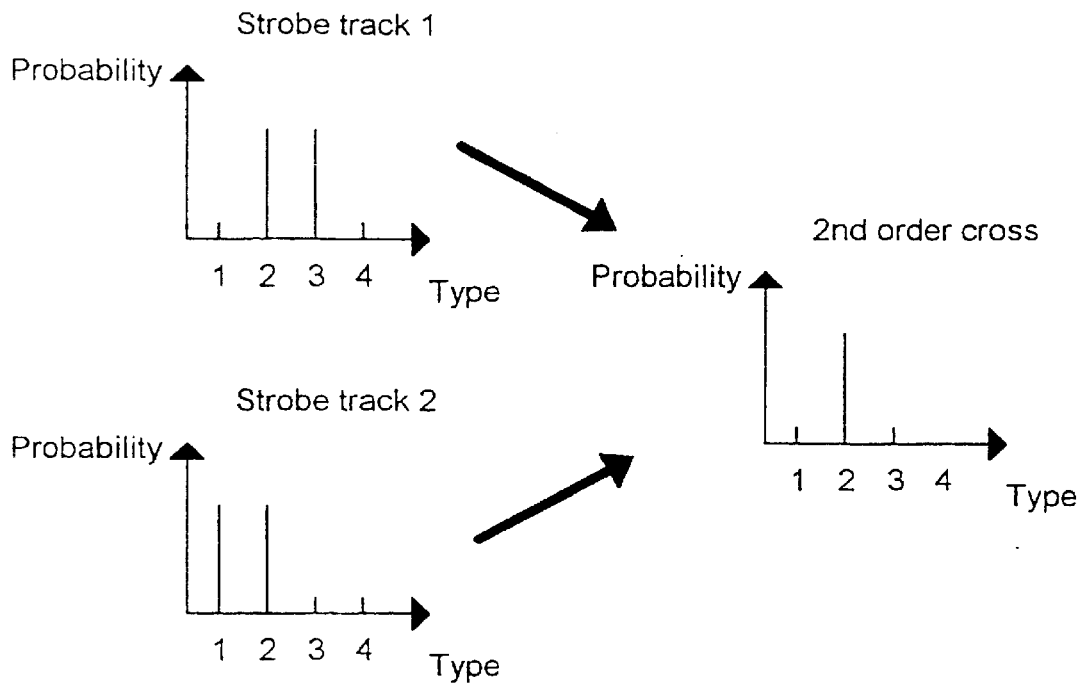
Figure 9:
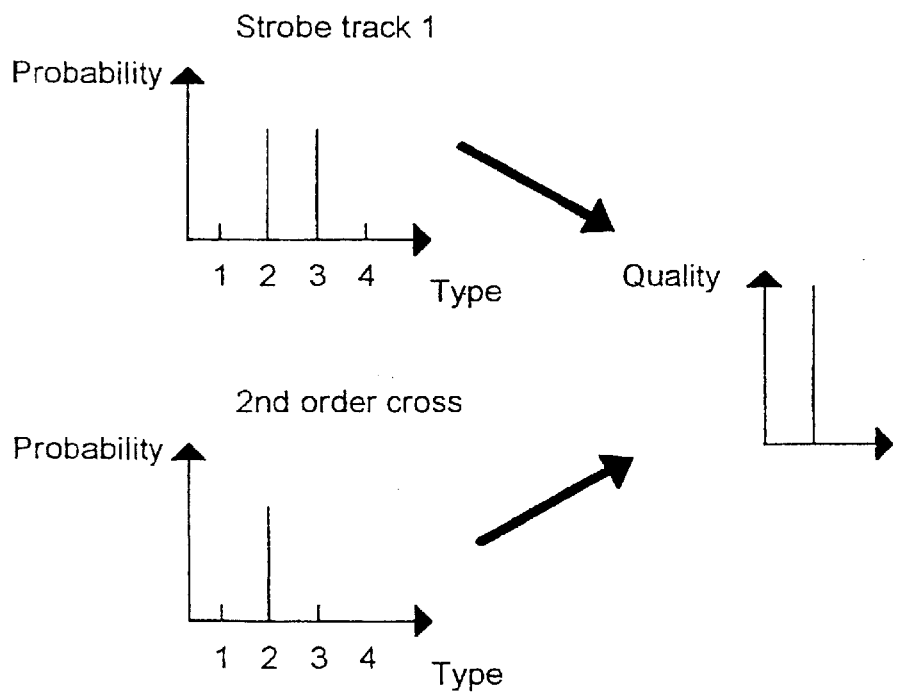
Figure 9:
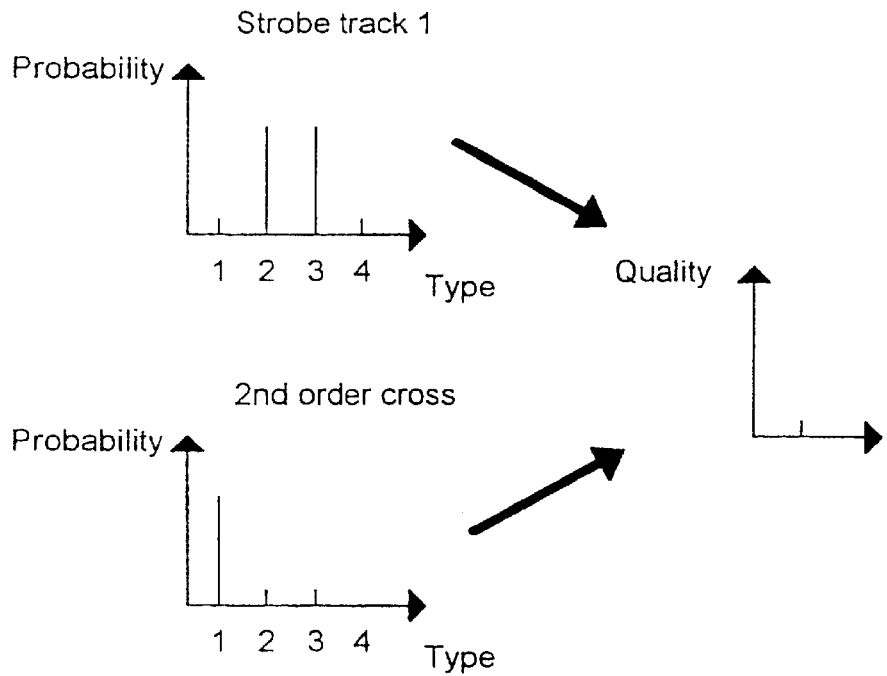
Figure 10:
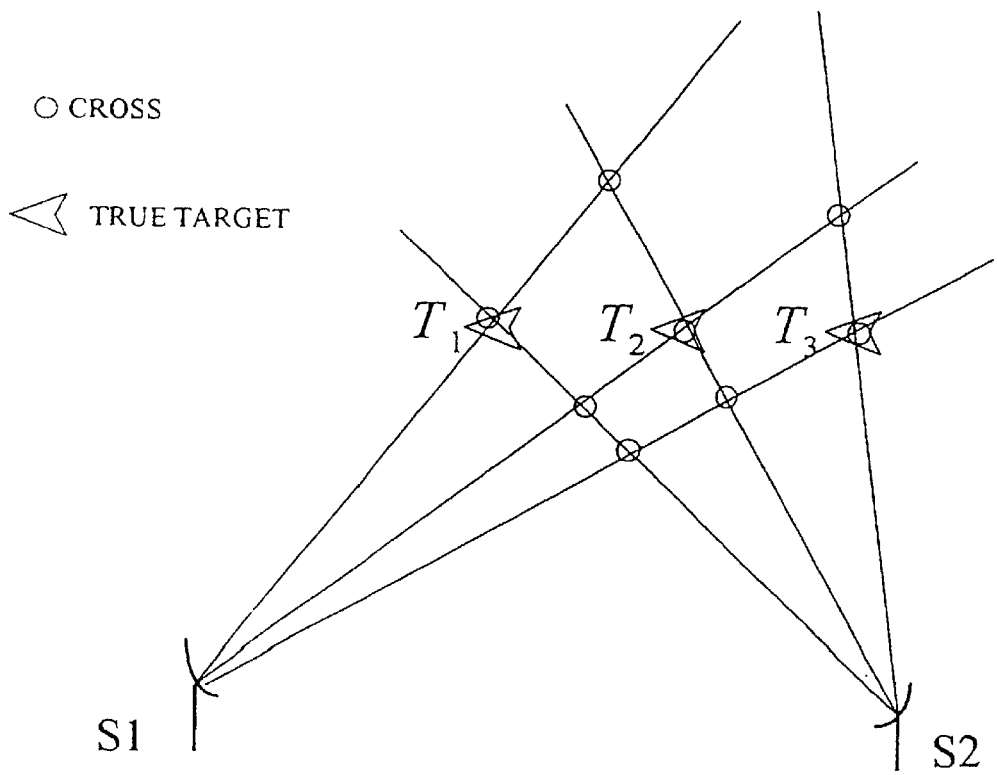
Figure 10:
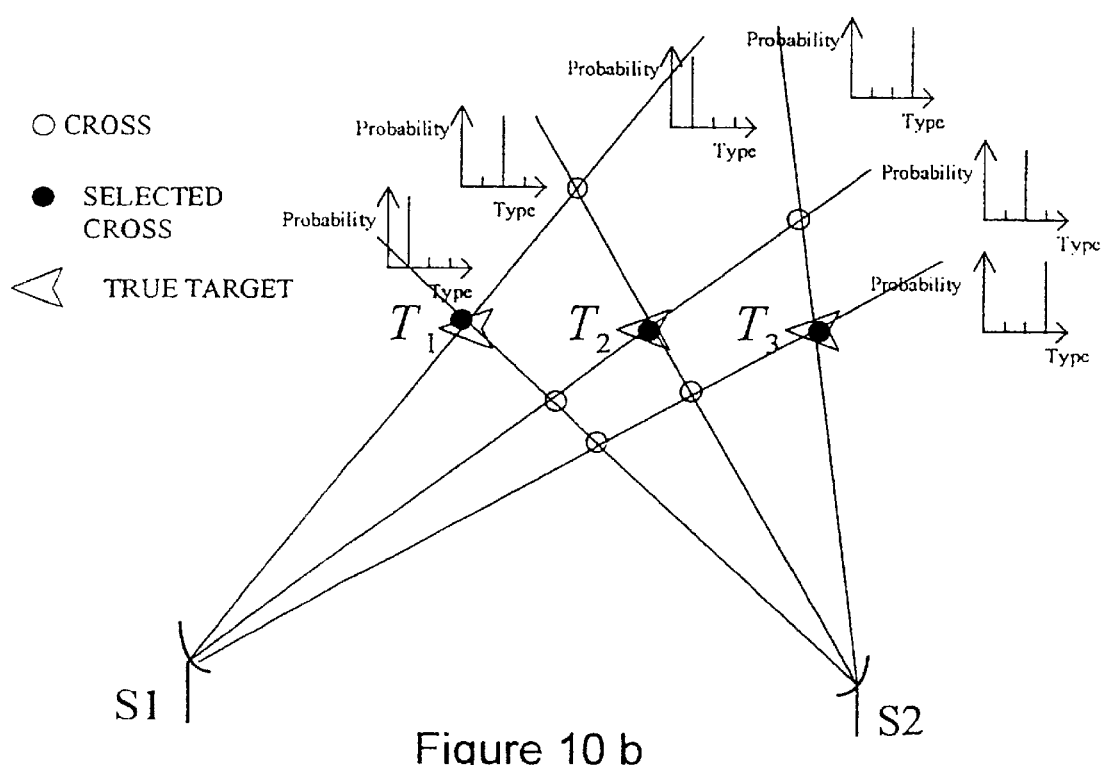

FIG. 7a and b illustrate track association situations, where discrete information is used in order to avoid erroneous associations;

FIG. 8 illustrates a calculation of a cross from two strobe tracks comprising target type estimation information;

FIGS. 9a and b illustrate cross quality calculations, comprising target type estimation information; and FIGS. 10a and b illustrate a situation, where target type estimation information is used for excluding "ghost targets".

DETAILED DESCRIPTION

A tracking process is a process in which measurements from active and passive radar systems or the like are used to estimate mainly kinematic quantities for a flying object. Plots, i.e. measurements stating the direction to (azimuthal angle and possibly elevation angle) and the distance between a flying object and the sensor, as well as strobes, i.e. measurements stating only the direction to a flying object (azimuthal angle and possibly elevation angle), are used as input data.

In a general tracking system, a system track is normally generated in some stage of the process. The system track is typically determined by a number of estimated kinematic quantities, such as track number, position, velocity, accelerations etc., which are generally results of filtering processes. These estimated quantities are normally accompanied by uncertainty measures and correlations in the form of covariance matrices. The system track may thus be represented as a vector X and a covariance matrix P The system track contains information on where the targets, what the speed is and where it is heading. System track will hence forward be used in order to denote such a unique quantity, estimated in a target tracking system. A target track or a track denotes a more general quantity that may exist in different parts of the tracking system.

Note, however, that there is most often no information on what type of target the track represents. Target type will in this context mean category or specific type of the actual aircraft in question. There may also exist other type of tracks during a tracking process, such as strobe tracks.

Figure 1:
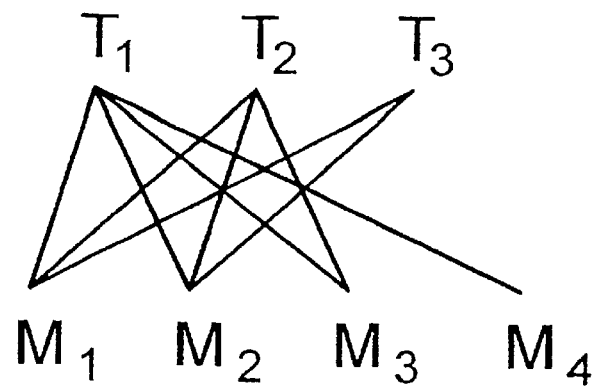
FIG. 1 is an example of a possible target type system.

For each target type system, i.e. for each situation where a target type estimation is supposed to be performed, a predefined number $N_T$ of possible target types $T_i$ are available, see e.g. FIG. 1:

$$\{T_i\}_{i=1}^{N_T}.$$

$T_i$ means that the target is of type $T_i$, while $$\{T_i\}_{i=1}^{N_T}$$

represents the set of all possible target types.

Measurements are then performed, and different discrete (enumerable) results are possible to obtain. Such results—measurement outcomes—are denoted $M_j$:

$$\{M_j\}_{j=1}^{N_M}.$$

$M_j$ means that the measurement outcome $M_j$ is detected, while $$\{M_j\}_{j=1}^{N_M}$$

represents the set of all measurement outcomes. $N_M$ is then total number of measurement outcomes in the target type system. In a general situation each target is associated with at least one measurement outcome. In the same manner, at least one target is associated with each measurement outcome. An example of a possible target type system is shown in FIG. 1. In this example, three target types and four measurement outcomes are available. Target type $T_1$, may give rise to all measurement outcomes $M_1$ to $M_4$, target type $T_2$ may give measurement outcomes $M_1$, $M_2$ and $M_3$, while target type $T_3$ may only give rise to measurement outcomes $M_1$ and $M_2$. It is thus understood that a measurement detecting measurement outcome $M_4$ indicates that target type $T_1$ is present, while the measurement outcome $M_3$ may origin from one of the target types $T_1$ or $T_2$, only excluding $T_3$. Such information of the relations between target type and measurement outcomes have to be added to the target type estimation process based on general considerations. The relations are possible to determine by a matrix $\Delta^{TM}$ of dimension $N_T \times N_M$, where "1" denotes a possible relation and "0" an impossible one. A matrix corresponding to the example of FIG. 1 therefore is, with target types running along the rows and measurement outcomes along the columns:

$$\Delta^{TM} = \begin{bmatrix} 1 & 1 & 1 & 1 \\ 1 & 1 & 1 & 0 \\ 1 & 1 & 0 & 0 \end{bmatrix}.$$

Target type estimates are added to the system track by including probabilities for the different target types in the system track. Unlike a continuous estimated quantity and its associated uncertainty, like X and P, the target type is represented by a set of probabilities, one for each target type in the limited group of possible target types, i.e they may be represented by a vector of discrete probabilities:

$$P(T_i), i=1, \ldots, N_T.$$

The probabilities are estimated based on a series of measurements, giving one of the measurement outcomes as a result. The measurements are denoted:

$$z(t_q),$$

where $t_q$ denotes the measurement time and where $q$ is an index running from 1 and up indicating the number of the measurement. The total set of measurements, $$Z(t_q)=\{z(t_q),z(t_{q-1}), \ldots ,z(t_1)\},$$

is the available information for creating the probabilities

The use of the measurements can be determined from Baye's rule and the total probability theorem as follows, (see e.g. Y. Bar-Shalom and X.-R. Li, "Estimation and Tracking: Principles Techniques and Software", Artech House, MA, USA, 1993, chapter 1)

$$P(t_q, T_i \mid Z(t_q)) = P(t_q, T_i \mid z(t_q), Z(t_{q-1})) \quad (1)$$

$$= \frac{P(t_q, z(t_q) \mid T_i, Z(t_{q-1}))P(t_q, T_i \mid Z(t_{q-1}))}{\sum_{i=1}^{N_T} P(t_q, z(t_q) \mid T_i, Z(t_{q-1}))P(t_q, T_i \mid Z(t_{q-1}))}$$

for $i = 1, \ldots, N_T$.

That means that the probability for one particular target type at a certain time $t_q$, given all measurements, is equal to the probability for the same target type, given all previous measurements and given the latest measurement. The probability can then be expanded into the normalised product of two factors. The first of these is the likelihood of obtaining the last measurement, given the target type and all previous measurements. The second factor is the probability for the particular target type at the present time but using only the previous measurements. The second factor is hence propagated (predicted) to the present time after the last update. This propagation is described below. Initial values are needed in order to start the recursion. They are given by the user selected prior target type probabilities $$P(t_0, T_i \mid Z(t_0)) = P_i^0, \text{ for } i=1, \ldots, N_T.$$

After a measurement has been used for updating the target type probabilities, the target type probabilities need to be propagated to the next measurement time for a new update and so forth. The propagation rests upon the following facts. First it is noted that target type information is reduced in quality between measurements (as is all other probabilistic information). Secondly, it is desirable that the effect of measurement errors decay as the time from the error increases. This is achieved by letting the target type probabilities decay exponentially towards the prior target type probabilities between measurements $$P(t_q, T_i \mid Z(t_{q-1})) = P_i^0 + (P(t_{q-1}, T_i \mid Z(t_{q-1})) - P_i^0) e^{-(t_q 31\ t_{q-1})/\tau}$$

for $i=1, \ldots, N_T$, where $\tau$ denotes the decay time. It is obvious to anyone skilled in the art that other decay relationships than an exponential can be used as well.

In order to complete the target type estimator, the likelihood has to be evaluated. It is understood that without approximations the computational task rapidly exceeds the practical limits, since the complete measurement history is involved in the calculation at each step. Approximations are therefore introduced. Examples will be described in detail further below.

An inherent problem in approximate and exact Bayesian methods is the inability to accurately handle ambiguities and ignorance (see e.g. S.S. Blackman "Multiple-Target Tracking with Radar Applications", Artech House, MA, USA 1986, p. 381). This will be focused on by an example.

EXAMPLE 1

Figure 3:
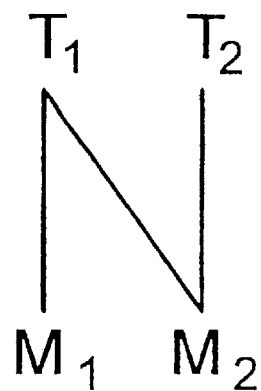
FIG. 3 is another example of a possible target type system, including an ambiguity possibility.

In FIG. 3, a very simple system is shown. Two possible target types $T_1$, $T_2$ and two possible measurement outcomes $M_1$, $M_2$ are available. The measurement outcome $M_1$ is only possible for target type $T_1$, while measurement outcome $M_2$ is possible for both target types. The above calculations are first approximated by only retaining the latest measurement outcome in the likelihood and by excluding the propagation ($\tau = \infty$). Then $$P(t_q, T_1 \mid Z(t_q)) = \frac{P(t_q, z(t_q) \mid T_1) P(t_{q-1}, T_1 \mid Z(t_{q-1}))}{P(t_q, z(t_q) \mid T_1) P(t_{q-1}, T_1 \mid Z(t_{q-1})) + P(t_q, z(t_q) \mid T_2) P(t_{q-1}, T_2 \mid Z(t_{q-1}))}$$

$$P(t_q, T_2 \mid Z(t_q)) = \frac{P(t_q, z(t_q) \mid T_2) P(t_{q-1}, T_2 \mid Z(t_{q-1}))}{P(t_q, z(t_q) \mid T_1) P(t_{q-1}, T_1 \mid Z(t_{q-1})) + P(t_q, z(t_q) \mid T_2) P(t_{q-1}, T_2 \mid Z(t_{q-1}))}$$

Assume that the system continuously measures $M_2$. This means that either of the target types may be present, and the probability of the two types should not change from the prior target type probabilities, since there is an ambiguity in the target type determination. The approximated likelihoods become (see FIG. 3 and note that all of the measurement history is now neglected)

$P(t_q, M_1 \mid T_1) = L_{11}$ $P(t_q, M_2 \mid T_1) = L_{21}$ $P(t_q, M_1 \mid T_2) = 0$ $P(t_q, M_2 \mid T_2) = 1$.

Here it is assumed that there are no measurement errors. Note that it is evident from FIG. 3 that $L_{11} + L_{21} = 1$. Furthermore, $0 < L_{11} < 1$ and $0 < L_{21} < 1$ or at least one possibility in FIG. 3 could be removed. Since $M_2$ is measured, the target type estimation algorithm becomes $$P(t_q, T_1 \mid Z(t_q)) = \frac{L_{21} P(t_{q-1}, T_1 \mid Z(t_{q-1}))}{L_{21} P(t_{q-1}, T_1 \mid Z(t_{q-1})) + 1 P(t_{q-1}, T_2 \mid Z(t_{q-1}))}$$

$$P(t_q, T_2 \mid Z(t_q)) = \frac{1 P(t_{q-1}, T_2 \mid Z(t_{q-1}))}{L_{21} P(t_{q-1}, T_1 \mid Z(t_{q-1})) + 1 P(t_{q-1}, T_2 \mid Z(t_{q-1}))}.$$

Dividing these equations gives $$Q(t_q) \equiv \frac{P(t_q, T_1 \mid Z(t_q))}{P(t_q, T_2 \mid Z(t_q))} = \frac{L_{21}}{1} \frac{P(t_{q-1}, T_1 \mid Z(t_{q-1}))}{P(t_{q-1}, T_2 \mid Z(t_{q-1}))}$$

$$= L_{21} Q(t_{q-1}).$$

Since $0 < L_{21} < 1$ it is clear that $$Q(t_q) \xrightarrow[q \to \infty]{} 0,$$

which means that $$P(t_q, T_1 \mid Z(t_q)) \xrightarrow[q \to \infty]{} 0$$

$$P(t_q, T_2 \mid Z(t_q)) \xrightarrow[q \to \infty]{} 1$$

i.e. a decision is made despite the fact that the situation is ambiguous. An article instability hence occurs. It can be shown that in cases where the target types have different numbers of possible measurement outcomes associated with them, this instability occurs.

One of the important features of the present invention is that the artificial instability, described in example 1 above, is avoided by modifying the method so that the estimated probabilities retain ambiguities in situations where such exist. This ambiguity restoring procedure is described in detail further below. A further important feature of the present invention is that the computational load is kept low since approximations in the likelihood calculations become possible with the ambiguity restoring procedure.

One of the simplest schemes possible for restoring the probabilities in situations with ambiguity would be to ignore any measurement outcomes, giving rise to such an ambiguity. The probabilities will of course not be changed, but information will be lost. In the tracking situation illustrated in FIG. 1, the measurement outcome $M_4$ will be used in the target type estimation. All other measurement outcomes $M_1$ to $M_3$ will be ignored. It is obvious that such an ambiguity restoring procedure will result in some improvement but it does not operate efficiently in general.

In a preferred embodiment of the present invention the ambiguity restoring procedure is realised within the scheme of approximation. Subsequently, such a preferable embodiment is described in the following. A first approximation is that only a certain number of the latest measurements are used in calculating the likelihood, but at least one per track. Generally, this is expressed as follows $$P(t_q, z(t_q)|T_i, Z(t_{q-1})) \approx P(t_q, z(t_q)|T_i, Z(t_{q-1}) \backslash Z(t_{q-1-\Delta q})), i=1, \ldots, N_T$$

$$Z(t_{q-1}) \backslash Z(t_{q-1-\Delta q}) = \{z(t_{q-1}), z(t_{q-2}), \ldots, z(t_{q-\Delta q})\}, \Delta q > 0.$$

In the following, the combination of approximations to obtain a low computational load and the ambiguity restoring procedure is illustrated for the case where the two latest measurements are retained, i.e. $\Delta q = 2$. It is a feature of the invention that the use of more than the latest measurement allows also good suppression of random disturbances. It would be clear for anyone skilled in the art how to generalize the procedure to $\Delta q > 2$ and to apply it for $\Delta q = 1$.

With the two last measurements available, the information thus consists of the measurement outcomes $$z(t_q) = M_q$$

$$z(t_{q-}) = M_{q-1}.$$

Using standard relations (see e.g. Y. Bar-Shalom and X.-R. Li, "Estimation and Tracking: Principles Techniques and Software", Artech House, MA, USA, 1993, chapter 1) the likelihood can be rewritten as $$P(t_q, z(t_q)|T_i, Z(t_{q-1})) = \frac{P(t_q, z(t_q), T_i, Z(t_{q-1}))}{P(t_q, T_i, Z(t_{q-1}))}$$

$$= \frac{P(t_q, z(t_q), T_i, z(t_{q-1}), Z(t_{q-2}))}{P(t_q, T_i, Z(t_{q-1}))}$$

$$= P(t_q, z(t_q)|T_i, z(t_{q-1}), Z(t_{q-2}))$$

$$P(t_q, z(t_{q-1})|T_i, Z(t_{q-2})) \frac{P(t_q, T_i, Z(t_{q-2}))}{P(t_q, T_i, Z(t_{q-1}))},$$

$$i = 1, \ldots, N_T.$$

Then consider the quotient in the right hand side of the last equality. When the effect of propagation is small and when more and more data are collected, the numerator and the denominator will be using almost the same information. In the limit where $q \to \infty$ this will hold true exactly as formulated in the following approximation $$\frac{P(t_q, T_i, Z(t_{q-2}))}{P(t_q, T_i, Z(t_{q-1}))} \approx \lim_{q \to \infty} \frac{P(t_q, T_i, Z(t_{q-2}))}{P(t_q, T_i, Z(t_{q-1}))} = 1$$

This reduces the likelihood to the product of two factors $$P(t_q, z(t_q)|T_i, Z(t_{q-1})) \approx P(t_q, z(t_q)|T_i, z(t_{q-1}), Z(t_{q-2})) P(t_q, z(t_{q-1})|T_i, Z(t_{q-2})), i=1, \ldots, N_T.$$

The final approximation is now to truncate the measurement history according to $\Delta q = 2$. This results in the following likelihood $$P(t_q, z(t_q)|T_i, Z(t_{q-1})) \approx P(t_q, M_q|T_i, M_{q-1}) P(t_q, M_{q-1}|T_i), i=1, \ldots, N_T$$

The above result can be represented as a look-up table, from which the requested probability values are picked when needed for the probability calculations. If only the two latest measurement outcomes are used, the look-up table will consist of a 3-dimensional data structure of dimensions $N_T \times N_M \times N_M$. In a real system, the number of possible target types could typically be of the order of 25–500 and the measurement outcomes could be several thousands, why the data structure is usually large. It is obvious to anyone skilled in the art that it is also difficult and cumbersome to find all conditional probability values. In the preferred embodiment of the invention the look-up table is constructed in such a way that the most important effects are captured by a small number of parameters. At the same time the ambiguity restoring procedure is introduced. One such possible scheme according to a preferred embodiment is presented next.

Above, it was shown that it is advantageous to introduce an ambiguity restoring procedure The origin of the problem was shown to be the fact that different target types can have different numbers of measurement outcomes associated with them. The first major step is then expressed in the following statement:

Define one of the target types to be the designing target type, denoted by $T_D$. $T_D$ is used for computation of those conditional probabilities that are related to ambiguities (described below). The obtained values are then applied to all the other target types using a special procedure. The other conditional probabilities, that are not related to ambiguities, do not need consideration of $T_D$ in the design.

With reference to example 1 above, this means that if $T_D$ is chosen equal to $T_2$, the modified result would become $$P(t_q, M_1|T_1) = L_{11}$$

$$P(t_q, M_2|T_1) = 1$$

$$P(t_q, M_1|T_2) = 0$$

$$P(t_q, M_2|T_2) = 1.$$

The effect is thus that $P(t_q, M_2|T_1)$ is modified from $L_{21}$ to 1. As a consequence, following the reasoning of the above example, no decision will be made in ambiguous situations.

In the following, the above described procedure involving a designing target type is applied to the case where the two latest measurement outcomes are retained. The design of the first factor of the likelihood, $P(t_q, M_q|T_i, M_{q-1})$, is first handled. The following parameters are used $P_C$: the probability of correct detection of measurement outcomes.

$P_E$: the probability of erroneous detection of measurement outcomes.

$P_1$: the probability of detection of measurement outcomes that are consistent (the measurement outcome is possible for the target type) with the possible measurement outcomes, for the designing target type The parameter $P_E$ is related to $P_C$ as $$P_E = \frac{1 - P_C}{N_M - 1} \quad (2)$$

since there is only one way to do a correct detection in the case without ambiguities. The parameter $P_1$ follows from the probability equation $$(N_M - N_M(d))P_E + N_M(d)P_1 = 1 \qquad (1)$$

since there are $N_M(d)$ possible consistent measurement outcomes for the designing target types and since the rest are erroneous. Thus $$P_I = \frac{N_M - 1 - (N_M - N_M(d))(1 - P_C)}{N_M(d)(N_M - 1)}. \qquad (3)$$

All parameters can therefore be computed from knowledge of the probability of correct detection for the sensor. This single detection probability therefore constitutes the only input parameter, except the original definition of the target type system, which is necessary to define the probabilities in the look-up table. It is important to note that these three parameters, originating from the same detection probability, are used for all target types in the scenario. One set of parameters thus results for each sensor.

The above three parameters are then used in order to compute the look-up table corresponding to $P(t_q, M_q | T_i, M_{q-1})$. This is done by consideration of the following four cases 1) $M_q = M_{q-1}$ and $M_{q-1}$ consistent with $T_i$.

2) $M_q \neq M_{q-1}$ and $M_{q-1}$ consistent with $T_i$.

3) $M_{q-1}$ inconsistent with $T_i$, $M_q$ consistent with $T_i$.

4) $M_{q-1}$ inconsistent with $T_i$, $M_q$ inconsistent with $T_i$.

These cases covers exactly all possible situations when the two last measurement outcomes are retained in the likelihood. It is assumed that all measurement errors are random.
1) In this case the two consecutive measurement outcomes are equal and consistent. Because of the high reliability (same measurement outcome and consistent measurement outcomes) this case is assigned the probability $P_C$.
2) In this case the previous measurement outcome was consistent with $T_i$ while the present one is different from the previous. The difference indicates a measurement error since the previous measurement outcome was consistent.
Measurement errors can also give rise to consistent or inconsistent measurement outcomes. Hence this case is assigned the probability $P_E$.
3) In this case the previous measurement outcome was inconsistent with $T_i$ which indicates an error. Then there is no information in the previous measurement outcome when the probability of the present measurement outcome shall be determined. In case 3) the present measurement outcome is consistent with $T_i$ which has the probability $P_1$ associated with it (neglecting the measurement history).
4) In this case the previous measurement outcome was inconsistent with $T_i$, which indicates an error. Then there is no information in the previous measurement outcome when the probability of the present measurement outcome shall be determined. In case 4) the present measurement outcome is inconsistent with $T_i$ which again indicates a measurement error. Hence the probability $P_E$ is associated with case 4).

By using the target type system definition matrix $\Delta^{TM}$, the probabilities can be expressed as:

$$P(t_q, M_q | T_i, M_{q-1}) = (P_C - P_E) \cdot \delta_{M_q M_{q-1}} \cdot \Delta^{TM}_{iM_q} \cdot \Delta^{TM}_{iM_{q-1}} + \qquad (4)$$
$$P_I \cdot \Delta^{TM}_{iM_q} \cdot (1 - \Delta^{TM}_{iM_{q-1}}) +$$
$$P_E (\Delta^{TM}_{iM_{q-1}} + (1 - \Delta^{TM}_{iM_q}) \cdot (1 - \Delta^{TM}_{iM_{q-1}})),$$

where $i = 1, \ldots, N_T$, $M_q = 1, \ldots, N_M$, $M_{q-1} = 1, \ldots, N_M$ and $\delta_{M_q M_{q-1}}$ is the Kronecker delta function.

For the second factor of the likelihood, $P(t_q, M_{q-1} | T_i)$, it is sufficient to distinguish between measurement outcomes consistent with $T_i$ that are given the probability $P_1$, and measurement outcomes that are inconsistent with $T_i$ that are given the probability $P_E$.

In terms of indices, the relation is:

$$P(t_q, M_{q-1} | T_i) = P_E + (P_I - P_E) \cdot \Delta^{TM}_{iM_{q-1}}, \qquad (5)$$
$$\text{where } i = 1, \ldots, N_T, \quad M_{q-1} = 1, \ldots, N_M.$$

This completes the likelihood calculation.

The simplest example of discrete measurements are direct observations. In such a case, there is a one-to-one agreement between target type and measurement outcome, why the target type system in such a case is defined by a square matrix with "1" in the diagonal.

EXAMPLE 2

A more relevant example of the above method is given by the situation defined by FIG. 1. The measurements are in this example ESM measurements and accordingly the measurement outcomes are emitter modes. The look-up table is thus a 3-dimensional data structure with dimension 4×3×4 and a 4×3 matrix. In order to visualise the data structure, each target type is illustrated separately, i.e. 3 separate matrixes 4×4 together with the 4×3 matrix. Target type 2 is selected as the designing target type. According to (2) and (3) the following parameters are obtained:

$P_C$: user choice.

$$P_E = \frac{1 - P_C}{3} \quad P_I = \frac{2 + P_C}{9}.$$

The data structures become $$P(t_q, M_q | T_1, M_{q-1}) = \begin{bmatrix} P_C & P_E & P_E & P_E \\ P_E & P_C & P_E & P_E \\ P_E & P_E & P_C & P_E \\ P_E & P_E & P_E & P_C \end{bmatrix}$$

$$P(t_q, M_q | T_2, M_{q-1}) = \begin{bmatrix} P_C & P_E & P_E & P_I \\ P_E & P_C & P_E & P_I \\ P_E & P_E & P_C & P_I \\ P_E & P_E & P_E & P_E \end{bmatrix}$$

$$P(t_q, M_q | T_3, M_{q-1}) = \begin{bmatrix} P_C & P_E & P_I & P_I \\ P_E & P_C & P_I & P_I \\ P_E & P_E & P_E & P_E \\ P_E & P_E & P_E & P_E \end{bmatrix}$$

-continued $$P(t_q, M_{q-1}|T_1) = \begin{bmatrix} P_I & P_I & P_I \\ P_I & P_I & P_I \\ P_I & P_I & P_E \\ P_I & P_E & P_E \end{bmatrix}$$

according to (4) and (5). In the three first equations above, $M_q$ runs over rows and $M_{q-}$ runs over columns. In the last equation above $M_{q-}$ runs over rows while $T_i$ runs over columns. Starting with $P(t_q,M_q|T_1,M_{q-1})$, a previous measurement outcome which is consistent with the considered target type $T_1$ and which is identical to the last measurement outcome will have probability $P_C$. Since all measurement outcomes are consistent with the target type $T_1$, the matrix has $P_C$ along the diagonal. The elements beside the diagonal correspond to the cases where both measurement outcomes are consistent with the target type $T_1$ (which in this example is true for any measurement outcome), but not equal. The new measurement is then considered as an error measurement with probability $P_E$. The whole matrix is thus fully determined by the sole factor $P_C$.

The matrix $P(t_q,M_q|T_2,M_{q-1})$, is built up slightly differently. Again, previous measurement outcomes which are consistent with $T_2$ and identical with the new measurement will be set to $P_C$. Since $T_2$ is consistent with $M_1$, $M_2$, and $M_3$ the first three diagonal elements are equal to $P_C$. In the same way as above off-diagonal elements except in column 4 are set to $P_E$. The elements in column 4 are connected to situations where the previous measurement was not consistent with the actual target type. However, if both measurements are inconsistent, in this example measurement outcome $M_4$, the result is considered as an error and will be assigned to the same probability as the other error measurements. The remaining elements correspond to cases where the previous measurement was inconsistent, but where the new one is consistent. These measurement outcomes are assigned the probability $P_1$.

The matrix $P(t_q,M_q|T_3,M_{q-1})$, is built similarly. Rows 1 and 2 are filled with $P_C$ at the diagonal and $P_E$ outside, since $T_3$ is consistent with $M_1$ and $M_2$. Columns 3 and 4 corresponds to situations with inconsistent previous measurement outcomes. Finally, the 4×3 matrix $P(t_q,M_{q-1}|T_i)$, contains $P_1$ whenever the measurement outcome is consistent with the target type and $P_E$ otherwise.

In this way the whole data structure, i.e. the look-up tables, are defined using only the target type—measurement outcome definition $\Delta^{TM}$ and one parameter (e.g. $P_C$) as shown by (2)–(5). By using the concept of a designing target type, all matrices are using the same set of probability values and thus any ambiguity is restored.

Simulation 1

Figure 4:
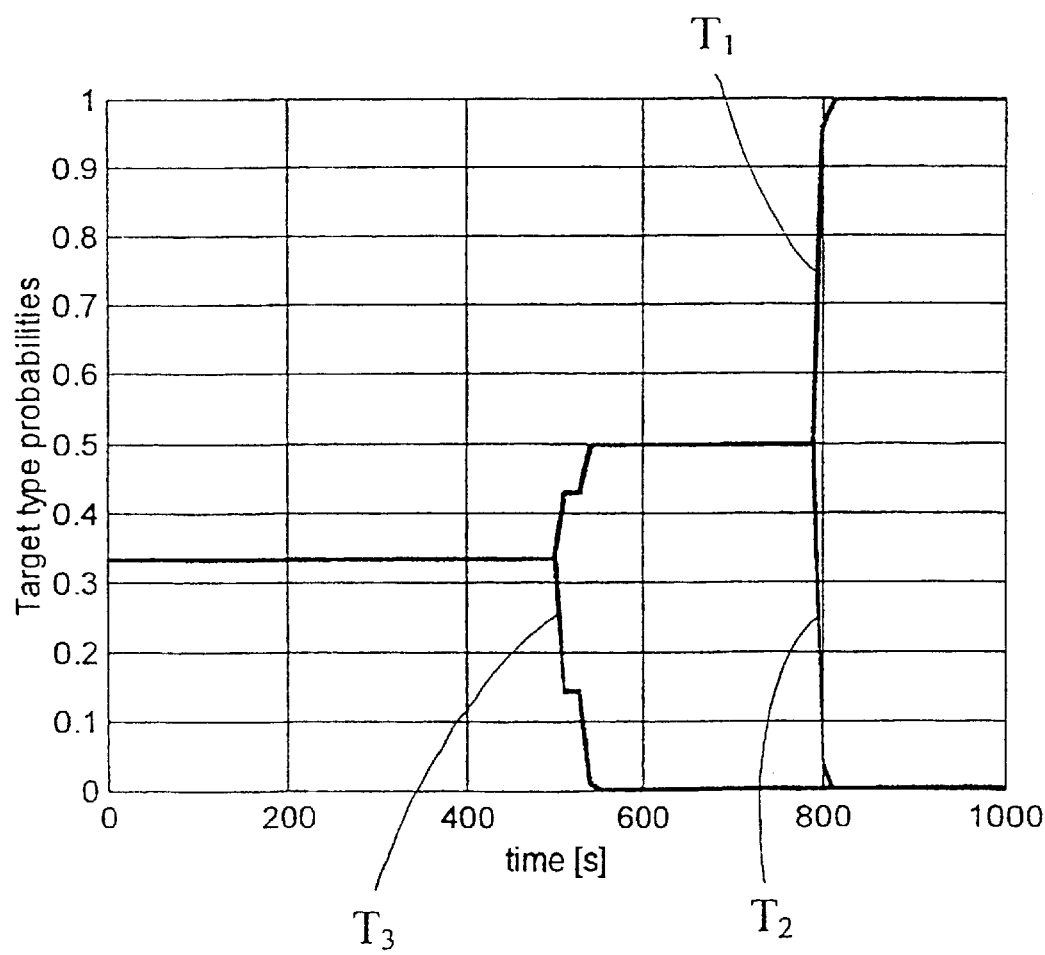
FIG. 4 is a diagram illustrating a simulation of a real target type estimation according to the invention.

The above example 2 is in the following used together with a series of measurements. The a priori probabilities for the three target types are equal, i.e. ⅓. The set of true emitter mode transmissions consists of a 100 totally, one every tenth second; 25 of measurement outcome $M_1$ followed by 25 of measurement outcome $M_2$, 25 of measurement outcome $M_3$ and finally 25 of measurement outcome $M_4$. The true transmissions are corrupted with a statistical error as high as 30%. Someone skilled in the art immediately concludes that $T_1$ is the correct target type. $P_C$, i.e. the probability for a correct measurement, is set to 0.70 which is in agreement with the simulated measurements. The obtained target type estimates are illustrated in FIG. 4. It can be seen in that figure that the scheme operates well despite the large amount of measurement errors The three curves $P_1$, $P_2$ and $P_3$ shows the estimated probability for the target types $T_1$, $T_2$ and $T_3$, respectively. After 500 seconds (50 measurements), information making it possible to exclude $T_3$ becomes available and $T_3$ is excluded after some time. The exclusion is soft because of the measurement errors. After 750 seconds (75 measurements) information becomes available, that allows also an exclusion also of $T_2$, which is automatically performed. This is a typical illustration of how the scheme operates by excluding target types that are not consistent with the obtained measurements given the prior information of possibilities.

Another example of measurements which are possible to use within the present invention are e.g. IRST measurements. The IRST measurements can give information about the existence of afterburner on an (air)target by measuring a change in intensity, the number of engines on a target, the size of a target (if range is available), missile firings from a target and kill assessments. From such measurements a set of measurement outcomes is definable.

EXAMPLE 3

Figure 5:
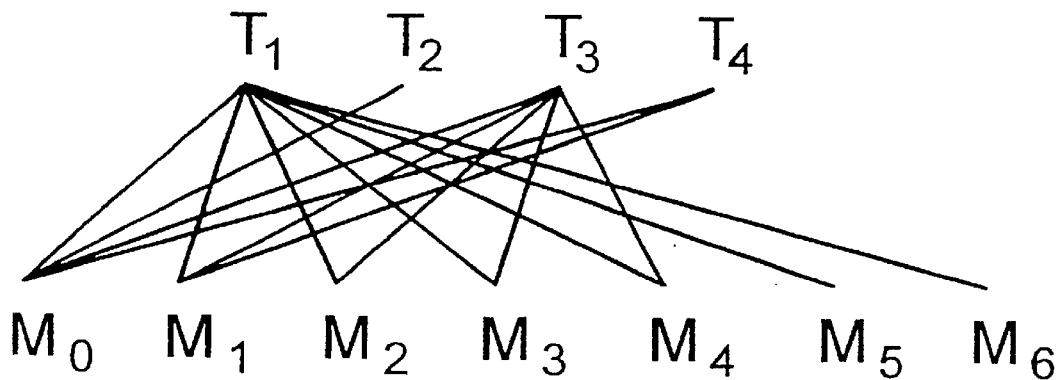
FIG. 5 is another example of a possible target type system, illustrating the use of IRST information.

In FIG. 5 an example of a target type system using IRST measurements is shown. Four target types are possible, $T_1$-fighter, $T_2$-bomber, $T_3$-fighter bomber and $T_4$-reconnaissance aircraft. The fighter can carry 6 missiles, the bomber is not equipped with missiles, the fighter bomber can carry 4 missiles and the reconnaissance aircraft can carry 2 missiles. Accordingly, 7 measurement outcomes are possible; $M_0$-0 missiles fired from the track, $M_1$-1 missile fired from the track, $M_2$-2 missiles fired from the track, $M_3$-3 missiles fired from the track, $M_4$-4 missiles fired from the track, $M_5$- 5 missiles fired from the track, $M_6$-6 missiles fired from the track. The relation between target types and measurement outcomes is in his case given by the matrix:

$$\Delta^{TM} = \begin{bmatrix} 1 & 1 & 1 & 1 & 1 & 1 & 1 \\ 1 & 0 & 0 & 0 & 0 & 0 & 0 \\ 1 & 1 & 1 & 1 & 1 & 0 & 0 \\ 1 & 1 & 1 & 0 & 0 & 0 & 0 \end{bmatrix}$$

The approximation scheme described above can then be used.

In a preferred embodiment of the present invention, discrete measurements of different types are used together. If there are measurements available from direct observations as well as from ESM and IRST measurements, they are possible to integrate in the calculation of one set of probabilities for the different target types, for each track. In this way the different data types each give their contribution to the exclusion of target types that are inconsistent with measurements and with prior knowledge of measurement outcomes and target types, as defined by matrices $\Delta^{TM}$. This is one of the very important advantages with the present invention. The set of measurements then consists of measurements of different types. The invention is not limited to direct observations, ESM information and IRST measurements. It is obvious to anyone skilled in the art how to integrate also e.g. COMINT (Communication Intelligence) information which is closely related to ESM information.

To describe how this is implemented it is most instructive to return to the definition of measurements and then to consider the update equation. in this description, only two types of different measurement outcomes—type 1 and type 2—will be discussed. The inclusion of other data sources by definition of e.g. measurement outcomes—type 3 follows a similar pattern and it is obvious for anyone skilled in the art how to proceed. The measurement outcomes—type 1 and measurement outcomes—type 2 may e.g. correspond to ESM measurements and IRST measurements, respectively.

The following quantities are needed:

$\{T_i\}_{i=1}^{N_T}$: the set of possible target types.

$\{M_j^1\}_{j=1}^{NM1}$: the set of possible measurement outcomes—type 1.

$\{M_j^2\}_{k=1}^{NM2}$: the set of possible measurement outcomes—type 2.

$Z_M^1(t_1)$ the present measurement—type 1, measured at time $t_1$.

$Z_M^2(t_m)$: the present measurement—type 2, measured at time $t_m$.

$Z(t_q)$: the present measurement—any type, measured at time $t_q$.

$Z(t_q)=\{z(t_q), \ldots, z(t_1)\}$: the set of all available measurements.

Note that the subscripts $_l$ and $_m$ do not take all values since they form a partition of the subscript $_q$ that does take all values.

The starting point is the previously discussed update equation, c.f (1)

$$P(t_q, T_i|Z(t_q)) = \frac{P(t_q, z(t_q)|T_i, Z(t_{q-1}))P(t_q, T_i|Z(t_{q-1}))}{\sum_{i=1}^{N_T} P(t_q, z(t_q)|T_i, Z(t_{q-1}))P(t_q, T_i|Z(t_{q-1}))}, i = 1, \ldots, N_T.$$

The purpose is to be able to use the same methods as defined above. In the previously disclosed process, a key detail is that the interdependence of different data types does not pose a problem, since there is only one type of data. The following simplifications are therefore used in the calculation of the likelihoods, when data from different measurement types are present:

$P(t_q,z_M^1(t_1)|T_i,Z(t_q)) \approx P(t_q,z_M^1(t_1)|T_i,Z(t_1)) = P(t_1,z_M^1(t_1)|T_i,Z(t_1))$, i=1, ...,$N_T$ $P(t_q,z_M^2(t_m)|T_i,Z(t_q)) \approx P(t_q,z_M^2(t_m)|T_i,Z(t_m)) = P(t_m,z_M^2(t_m)|T_i,Z(t_m))$, i=1, ...,$N_T$.

This means that each data type is handled separately in the calculation of the likelihoods. The likelihoods are, however, used for updating of one single set of target type probabilities. The previously described methods can with this simplification now be used for simplified computation of the likelihoods of the different data types. A very important feature with the method of the present invention is that this fusion of different sets of discrete data is easily carried out.

Figure 2:
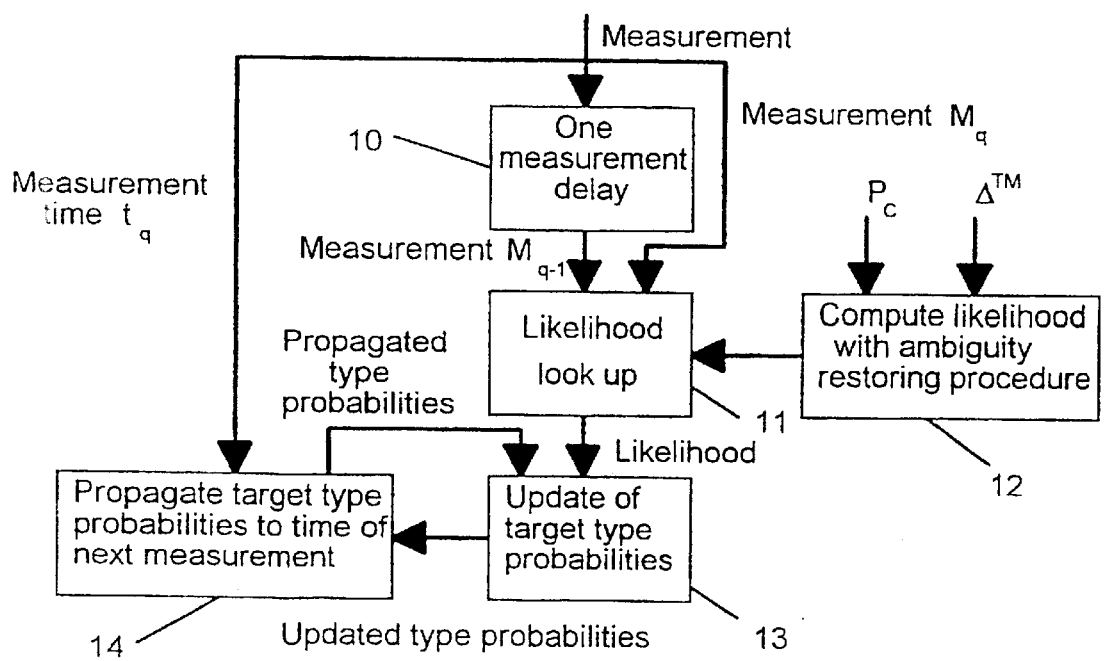
FIG. 2 is a block diagram of a preferred embodiment of a target type estimation system according to the present invention.

The probability calculations according to a preferred embodiment of the present invention follow in general terms the procedure illustrated in FIG. 2. Here, the flow of the different measurements are shown together with the dependence of the user selected probability of correct detection and the target type system definition. A measurement is performed and the result is sent to box 10. In this box, the measurement will be delayed one step in order to become the second latest measurement $M_{q-1}$ when passed further to box 11. The latest measurement will also pass directly to box 11, then being the latest measurement $M_q$. The probability for correct detection $P_C$ and the definition matrix $\Delta^{TM}$ of the target type system is used in box 12 to compute the likelihood with an ambiguity restoring procedure to form a likelihood look-up table The likelihood is computed in box 11 using the look-up table and the two last measurements $M_q$, $M_{q-1}$ and is used to update the target type probabilities in box 13. The updated type probabilities are in box 14 propagated to the time for the next measurement $t_q$, which originates from the measurements, and propagated type probabilities are delivered back to be used in the next update of target type probabilities in box 13.

As mentioned in the introduction of the detailed description, type probabilities are possible to use in different stages of a target tracking procedure. In the following, a preferred multi-sensor multi-target tracking system, which in part is disclosed in the swedish patent application No. 9700709-0, is summarized as a background for other possible uses for the present invention, but first a few definitions are needed.

A plot is defined as a direction and a range, i.e. a position in space. Range information is available if the sensor is of an active type. A measurement from a passive sensor has no range information, why the results are purely bearing information, and in this case the measurement is called a strobe. If several strobes from the same sensor are assumed to origin from the same target, a strobe track may be initiated, i.e. a track in the angular coordinates with reference to a certain sensor. Where two strobes or strobe tracks crosses, strobe crosses and strobe track crosses, respectively, may be calculated. These strobe crosses or strobe track crosses correspond in some sense to plots, since they define a position in real space. A quantity, cross quality, can be defined for every cross, which indicates the magnitude of agreement between the involved strobes or strobe tracks. A cross is said to be of $2^{nd}$ order if two strobe tracks are used to form it, of $3^{rd}$ order if three strobe tracks are used, and so on.

Figure 6:
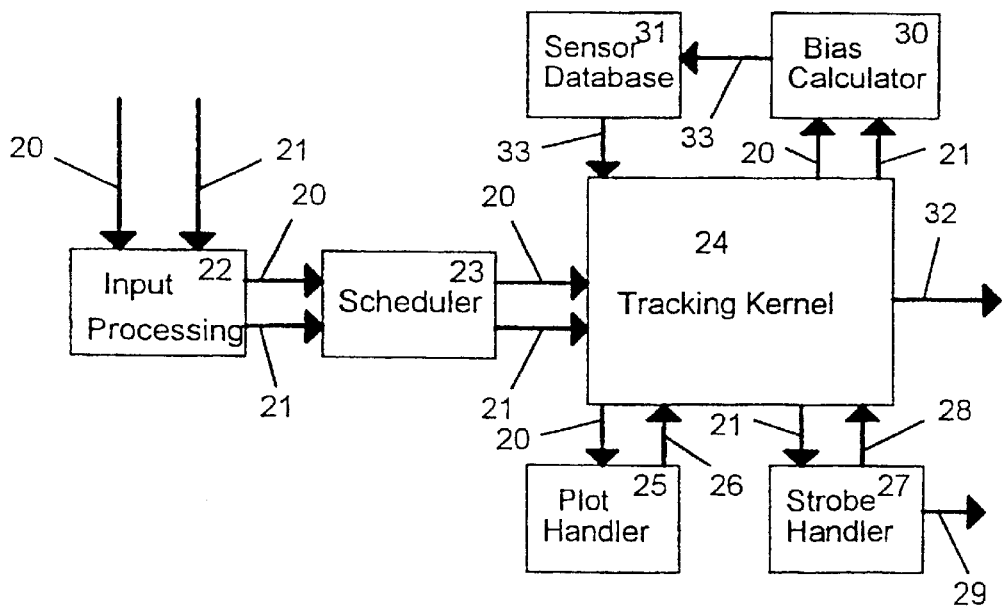
FIG. 6 is a block diagram of a target tracking system according to the state of the art.

The preferred multi-target tracking system is best described with reference to FIG. 6. Note that strobes and tracks will generally carry type related information when the tracker is upgraded with the invention described herein.

Plots 20 and strobes 21 are first preprocessed in an input processing unit 22 and collected in time batches in a scheduler 23. The plots 20 and the strobes 21 are then sent to a tracking kernel 24 for association to existing system tracks 32. Associated plots 20 and strobes 21 are used for updating of these system tracks 32. Plots 20 that are not associated to system tracks 32 are sent to a plot handler 25 for initiation of new system tracks 26. Strobes 21 that are not associated to system tracks 32 are sent to a strobe handler 27 for initiation of strobe tracks, calculation of strobe track crosses 29 and finally initiation of new system tracks 26. Bayesian algorithms are used for triangulation (creation of strobe track crosses 29) and deghosting. A bias calculator 30 continuously computes bias compensation parameters 28 from measurements that are firmly and uniquely associated to high quality tracks. Such bias compensation parameters 28 are stored in a sensor database 31 and used during the tracking process. System tracks and strobe track crosses 29 are sent for display.

The MST (Multi-Sensor Tracker) makes full use of sensor oriented coordinate systems for maximum flexibility. This makes it possible to handle an arbitrary mix of active and passive measurements at all times.

All system tracks are represented and propagated in a Cartesian, 3-dimensional, earth tangential coordinate system, centered somewhere in the surveillance area. The system tracks are transformed to map coordinates for display. The association of data to system tracks is performed in the measurement space to allow a handling of passive measurements without range information in a coherent manner. The system tracks are thus transformed to (possibly a lower dimensional) measurement space where a conventional multiple hypothesis maximum likelihood association is performed, see e.g. S. S. Blackman "Multiple-Target Tracking with Radar Applications", Artech House, MA, USA, 1986, pp 249–280. To improve the performance, scan to scan memory is introduced in the association process by the use of multiple hypothesis tracking (MHT) (S. S. Blackman, "Multiple-Target Tracking with Radar Applications", Artech House, MA, USA, 1986, pp 289–300). The MST described here implements a variant of MHT that is sometimes denoted track oriented MHT. All associations with a sufficiently high quality, together with a coasting alternative, are then retained. The resulting hypotheses are used in order to form alternative tracks, for each system track. The probability that each alternative is correct, conditioned on the fact that there is only one target, is updated with Bayesian techniques. Hypotheses are removed when they fall below a threshold.

The system tracks are also updated in the measurement space of each sensor, using extended Kalman filter (EKF) techniques, see e.g. Y. Bar-Shalom and X. -R. Li, "Estimation and Tracking: Principles, Techniques and Software", Artech House, MA, USA, 1993, pp 382–399.

The initiation of tracks is treated separately for active (plots) and passive (strobes) measurements. The active initiation relies on multiple hypothesis techniques, from scan to scan. The automatic passive initiation is much more elaborated. Briefly, it relies on triangulation of strobe tracks to form crosses. The quality of each cross is then evaluated with very advanced Bayesian techniques. Adaptive clutter density maps are automatically updated in the system to support the track initiation process.

The obvious objective for the target type identification method achieved by the present invention is thus to be used to identify a target type for each track (strobe track, target track or system track) in a tracking system as the one described above. The additional information that is created by estimating target types can also be used in order to improve existing functionality in a kinematic tracking system as the one described above.

To describe this, each (kinematic) track (strobe track or target track or system track) of the system is first extended with a discrete part, said part consisting of the estimated target type probabilities as described above. This discrete track is updated and propagated according to the descriptions above.

A necessary prerequisite for using the target type estimates in other parts of the tracking system is the computation of quantity denoted the discrete measurement probability function. This quantity is the probability of the measurement (discrete set of measurement outcomes) given the estimated target type probabilities of a particular track. The computation is technically involved and the details can be found in appendix A. The case where the two latest measurement outcomes are retained is discussed here. The result is $$f_D(t_q, p, n) \approx \sum_{i=1}^{N_T} P(t_q, M_q^p | T_i^n, M_{q-1}^n) P(t_q, M_{q-1}^n | T_i^n) P(t_q, T_i^n | Z^n(t_{q-1})).$$

Here, the index p denotes measurement number p in a set of measurements. The index n means that the quantity belongs/refers to (discrete) track number n. The quantity $f_D(t_g,p,n)$ is therefore the probability of the measurement p given all information condensed in track n. This quantity thus measures how well the particular measurement correlates to the particular track. The result of the computations is thus a sum over quantities consisting of three factors. It can be seen that the two first factors correspond to the likelihood discussed previously. However, as previous measurement the previous measurement that was used for updating of the particular track shall be used. The last factor consist of the estimated target type probabilities of track n.

Association

The discrete probability functions achieved by the above described method are possible to integrate with continuous probability functions based on the kinematic parameters, e.g. in the target tracks achieved by the above described process. To describe this process it is suitable to first discuss the basics of data to track association in kinematic multiple target tracking and to illustrate the use of discrete information in the association process. It is obvious to anyone skilled in the art that the kinematic association process described here is one of many possibilities and that the present invention regarding the integration of target type information may be applied to other kinematic association processes than the one described herein.

When the system receives measurements from the sensors it collects them in time sliced batches. As soon as a batch is filled with measurement reports it is sent to the tracking system. Before the measurements can be used to update the present tracks in the tracking system it must be determined which measurement (if any) that corresponds to a specific track. This procedure is usually denoted association or correlation. In one possible implementation the procedure can be roughly divided in three main steps.

Step 1: The first step is to exclude tracks that are out of range of the measurements of one particular sensor in the present time slice. This means that min/max limits of range, azimuth and elevation are computed and that those tracks that do not fall within these limits are excluded from the association procedure In the case where discrete information is available one can also use known limitations of for example ESM sensors to exclude tracks that cannot possibly have generated the measurement. For example, band limitations of sensors may exclude emitter mode measurements in certain frequency bands, which may in turn exclude tracks associated with particular target types. The tracks that fulfil the limitations of the sensor are the only tracks that are considered in the subsequent association procedure. Step 1 ends by propagation of each remaining track to the mean time of the remaining measurements. (This should be close to the mean time of the time slice provided that there is a significant number of measurements.)

Step 2: The second step in the measurement to track association comprises forming measurement and track clusters. A cluster is a set of measurements and tracks such that 1) The measurements are exactly those that are included in the union of the track search regions and 2)The clusters cannot be divided into smaller clusters.

It is important to note that the search regions are defined in the measurement space. This space can include kinematic dimensions as well as dimensions corresponding to measured discrete information. For example, the measurements may consist of azimuth and emitter mode from an ESM sensor in which case the measurement space has two dimensions (continuous azimuth and discrete type). Since the dimension of the track may be higher than that of the measurement space the track is transformed to the measurement space.

The clustering procedure starts with a measurement (a point in the measurement space). Tracks that are within a search region centered around the measurement are then included in the cluster. For each track in the cluster, measurements that are within a search region centered around the track are then included in the cluster. The procedure continues until it terminates or until a maximum number of measurements and tracks are obtained for the particular cluster. In order to make this procedure successful, the search regions need to be increased from pure measurement and track uncertainties to account also for timing errors. These errors occur because the mean time of the measurements must be used in the clustering.

Step 3: The third and last step is a multi hypotheses test procedure based on statistical maximum likelihood techniques. The purpose is to find an optimal association of measurements to tracks within each cluster. The procedure is denoted the LPQ (Logarithmic Probability Quotient) and it is described in some detail below.

To explain the LPQ method it is assumed that there is precisely one measurement considered and the task is to determine whether this measurement shall be associated with the track in question. When doing so the following two constraints must be fulfilled.

1) At most one measurement can be associated with each track.
2) Each track generates at most one measurement.

The following hypotheses are now relevant.

$H_1$) The measurement is true, originates from a true target and no false measurement is obtained.

$H_2$) The measurement is false and originates from a false target.

$H_3$) The measurement is false, originates from a true target and this target is not detected.

It is also assumed that the probability of detection of the sensor is $P_D$ that the probability that the measurement is spurious (false) is $P_S$. and that the probability that the track corresponds to a true target (probability of true target) is P(TT). Furthermore, the probability density function (pdf) of the kinematic part of the measurement conditioned on the predicted track is denoted $f_K(t_q,p,n)$. This pdf is usually Gaussian and it may be evaluated in the track coordinate system (3-D measurements) or in the measurement space. The probability density function of the discrete part of the measurement conditioned on the target type probabilities of the track and previous measurements, is denoted $f_D(t_q,p,n)$.

The next step is then to consider a cluster of measurements and tracks. The task is to determine which measurement (if any) that belongs to a particular track. This requires a measure that determines the quality of a tentative association of track n to measurement p (cf. the discussion above on the discrete probability functions). Towards that end, consider the hypotheses above and assume that all phenomena above can be treated as statistically independent. Then the likelihoods of the hypotheses above can be expressed as follows $p(t_q,H_1,p,n,) P_D P(TT) f_K(t_q,p,n) f_D(t_q,p,n)$ $f_K(t_q,p,n)=f_K(t_q,z_K^p(t_q|\hat{X}^n(t_q|t_{q-1}),P^n(t_q|t_{q-1}))$ since normally $P_S \approx 0$. Here, the kinematic part of measurement p is denoted $z_K^p(t_q)$. $\hat{X}^n(t_q|t_{q-1})$ denotes the propagated kinematic state of the track and $P^n(t_q|t_{q-1})$ denotes the corresponding covariance matrix (of track n). Note that this probability density function is defined in the measurement space and that it is normally Gaussian. Considerations similar to those above give $p(t_q,H_2,p,n) P_S(1-P(TT))$ $p(t_q,H_3,p,n) P_S P(TT)(1-P_D)$ As a measure of whether it is good or bad to associate measurement p with track n it is now very natural to use $$lpq(t_q, p, n) = \log\left(\frac{p(t_q, H_1, p, n)}{p(t_q, H_2, p, n) + p(t_q, H_3, p, n)}\right).$$

The reason is that under $H_2$ and $H_3$ there is no reason to do an association, while this should be considered an alternative under $H_1$. The logarithmic probability quotient (lpq) of these events is then a natural score function. Note that the score function will be positive if $H_1$ is more likely than the other hypotheses when combining track n with measurement p. Some algebra results in $$lpq(t_q, p, n) = \log\left(\frac{P_D P(TT) f_K(t_q, p, n) f_D(t_q, p, n)}{P_S(1 - P_D P(TT))}\right).$$

Having computed the score function for a general track to measurement association the best combination among all possible such associations need to be determined since this solves the problem. Towards this end the following matrix is introduced where the rows are indexed by measurements and the columns by tracks.

$$LPQ = \begin{bmatrix} lpq(t_{q1}, 1, 1) & \cdots & lpq(t_{q1}, 1, N) \\ \vdots & \ddots & \vdots \\ lpq(t_{qP}, P, 1) & \cdots & lpq(t_{qP}, P, N) \end{bmatrix}$$

The optimization problem now consists of choosing at most one element of each row and at most one element of each column so that the sum of the chosen elements is maximized. Methods that solve this problem is readily available from e.g. S. S. Blackman, "Multiple-Target Tracking with Radar Applications", Artech House, MA, USA, 1986, pp 397–401.

The use of the discrete measurements in the last step of the association process can thus be summarized as follows:
Prerequisites:
1) Each track is extended with a discrete state consisting of target type probabilities. Each track is updated and propagated according to the methods outlined above.

Data to track association:
1) Compute the discrete probability function $f_d(t_q,p,n)$ for any measurement to track association.
2) Replace the kinematic only probability density function $f_K(t_q,p,n)$ with the product $f_K(t_q,p,n) f_D(t_q,p,n)$ in the computation of $lpq(t_g,p,n)$
3) Run all existing functionality for kinematic data to track association as usual.

The association process has above been described for tracks. Anyone skilled in the art will understand that this process can be extended to different kinds of tracks, than the ones discussed herein.

EXAMPLE 4

To illustrate the improvements that can be expected, FIGS. 7a and 7b show a scenario with two targets T1 and T2, where the filled shapes symbolises the different target types, and two measurements (strobes) S1 and S2 that are to be associated. The line extending from the target track indicates the velocity by the direction of this line. In FIG. 7a only kinematic information is used, i.e. no significance is paid to the target type information, while target type information is used in FIG. 7b. The angular accuracy's of the strobes are assumed to be significantly larger than the angular separation between the strobes. It can be seen that the association in FIG. 7a fails and associates strobe S1 to target track T1 and strobe S2 to target track T2. However, the additional information from the target type estimation, symbolised by the empty shapes at the end of the strobes, make a correct association possible in FIG. 7b, i.e associating strobe S1 to target track T2 and strobe S2 to target track T1.

The above four step procedure (prerequisites and data to track association) is in fact of general validity. An important advantage of the present invention is that it uses this procedure in a multitude of existing functions in the kinematic target tracking system. The use and benefits of using the procedure in data to track association (to system tracks) have been illustrated above. Next, the use of the procedure in other parts of the tracking system is discussed.

Strobe tracking

In an MST system as the one described above a method for passive initiation of multiple tracks is available The first step is there that strobe tracking is performed for each sensor. The process of strobe tracking comprises a full multiple target tracking process in the angular domain, that is performed for each sensor. In that process strobe tracks (essentially Kalman filter states in the angular domain) are maintained and incoming strobes are associated to the strobe tracks. In this process discrete target type related data can be used exactly as in the association of strobes to system or target tracks, using the four step procedure above. The only difference is that the kinematic tracks now reside in the angular domain.

Computation of track quality

In order to compute the logarithmic probability quotients it is necessary to have an estimate of P(TT). It is the purpose of this section to show how this value is computed when discrete information is available. The probability of true target is the propagated value of the quantity when used for association purposes, see below.

The scanning mono sensor case is considered here. In this case it is known whether a measurement miss has occurred since it is possible to predict the next time of the measurement from a particular track. If no measurement is associated with the track for a specific batch and if an association should have taken place during the time span of that batch, then a measurement miss has occurred.

First consider the case when a measurement has been obtained. Now, by definition $$P(TT, t_q) = P(TT|Z(t_q)) = P(TT|z(t_q), Z(t_{q-1}))$$

$$= \frac{P(z(t_q)|TT, Z(t_{q-1}))P(TT|Z(t_{q-1}))}{P(z(t_q)|Z(t_{q-1}))}$$

$$= \frac{P(z(t_q)|TT, Z(t_{q-1}))P(TT, t_{q-1})}{P(z(t_q)|TT, Z(t_{q-1}))P(TT, t_{q-1}) +}.$$

$$P(z(t_q)|\neg TT, Z(t_{q-1}))(1 - P(TT, t_{q-1}))$$

Assume that $P(z(t_q)|TT, Z(t_{q-1})) \approx P(z(t_q)|TT)$ and $P(z(t_q)|\neg TT, Z(t_{q-1})) \approx P(z(t_q)|\neg TT)$.

Then it follows immediately that $$P(TT, t_q) = \frac{P(z(t_q)|TT)P(TT, t_{q-1})}{P(z(t_q)|TT)P(TT, t_{q-1}) + P(z(t_q)|\neg TT)(1 - P(TT, t_{q-1}))}.$$

The likelihoods can then be evaluated. The result is $P(z(t_q)|TT) = P_D f_K(t_k, p, n) f_D(t_q, p, n) + P_S(1 - P_D)$ $P(z(t_q)|\neg TT) = P_S$ This gives the result $$P(TT, t_q) = \frac{1}{1 + \frac{P_S}{P_D f_K(t_q, p, n) f_D(t_q, p, n) + (1 - P_D)P_S} \frac{1 - P(TT, t_{q-1})}{P(TT, t_{q-1})}}.$$

When no measurement has been received when it should the result is instead, using similar approximations as above $$P(TT, t_q) = P(TT|\neg z(t_q), Z(t_{q-1}))$$

$$= \frac{P(\neg z(t_q)|TT, Z(t_{q-1}))P(TT, t_{q-1})}{P(\neg z(t_q)|TT)P(TT, t_{q-1}) + P(\neg z(t_q)|\neg TT)(1 - P(TT, t_{q-1}))}$$

$$\approx \frac{P_S(1 - P_D)P(TT, t_{q-1})}{P_S(1 - P_D)P(TT, t_q) + P_S(1 - P(TT, t_{q-1}))}$$

$$= \frac{1}{1 + \frac{P_S}{1 - P_D} 1 - \frac{P(TT, t_{q-1})}{P(TT, t_{q-1})}}$$

The integration of discrete data is again reduced to a simple multiplication of the discrete probability function with the kinematic counterpart. Although the above description was for the monosensor case, ir is obvious for anyone skilled in the art how to extend it to the multi-sensor case.

Multiple Hypotheses Tracking

As described above, MHT introduces delayed decisions in the association process by retaining all ambiguous associations until they are resolved. This is done by starting one internal track for each association to the system track. The quality of these alternative tracks are then continuously evaluated by a track credibility measure, as the one described above. Discrete data can be included in this process by the four step procedure described above. Alternative tracks with a poor goodness of fit in the target type domain will then be more efficiently pruned.

Calculation of Strobe Track Crosses

In the above mentioned MST system a procedure for computation of the kinematic crosses between strobe tracks is used. In that procedure, strobe tracks (containing bearing (s) and bearing rate(s)) are combined to produce a position and a velocity in Cartesian coordinates. First a rough gating excludes infeasible combinations of strobe tracks Then all crosses between strobe tracks are computed statistically. First, all crosses containing two strobe tracks are computed. Then all crosses with three participating strobe tracks are computed and so on up to an order equal to the number of sensors that are connected to the data processing center.

Now strobe tracks can be extended to also contain target type information. This has been described in detail above. It is then natural to use the target type information also in the computation of strobe track crosses. This type of information in a strobe track cross is for example helpful when a system track is initiated from the cross. The question is then how to compute the resulting target type state, given the target type states of the strobe tracks. This corresponds, in some sense, to the weighted averages that occur in the kinematic computation of strobe track crosses.

Denote the strobe tracktypes by $S_j$, $j=1, \ldots, N_S$. The sought quantities in the case of a strobe track cross of order N are then $P(T_i^X|S_{j_1}, \ldots, S_{j_N})$, $i=1, \ldots, N_T$.

Here the indices $j_1$ to $j_N$ is a subset of the available strobe tracks, that are ail produced by different sensors $T_i^X$ is here the target type i of the strobe track cross X. Baye's rule and the total probability theorem give $$P(T_i^X | S_{j_1}, \ldots, S_{j_N}) = \frac{P(S_{j_1}, \ldots, S_{j_N} | T_i^X) P(T_i^X)}{\sum_{i=1}^{N_T} P(S_{j_1}, \ldots, S_{j_N} | T_i^X) P(T_i^X)},$$

$$i = 1, \ldots, N_T.$$

The prior target type probabilities $p(T_i^X)$ are obtained from prior information. One solution is to set them all equal so that their sum equals 1. The other quantities can be evaluated as follows $$P(S_{j_1}, \ldots, S_{j_N} | T_i^X) = \frac{P(S_{j_1}, \ldots, S_{j_N} | T_i^X)}{P(T_i^X)}$$

$$= \frac{P(S_{j_1}, T_i^X, S_{j_2}, T_i^X, \ldots, S_{j_N}, T_i^X)}{P(T_i^X)},$$

$$i = 1, \ldots, N_T.$$

Assume that the strobe tracks are statistically independent. The following approximation is then motivated $$P(S_{j_1}, T_i^X, \ldots, S_{j_N}, T_i^X) \approx \prod_{k}^{N} P(S_{j_k}, T_i^X)$$

$$= (P(T_i^X))^N \prod_{k=1}^{N} P(S_{j_k} | T_i^X),$$

$$i = 1, \ldots, N_T.$$

When this is inserted above the final result becomes $$P(T_i^X | S_{j_1}, \ldots, S_{j_N}) \approx \frac{(P(T_i^X))^N \prod_{k=1}^{N} P(S_{j_k} | T_i^X)}{\sum_{i=1}^{N_T} (P(T_i^X))^N \prod_{k=1}^{N} P(S_{j_k} | T_i^X)},$$

$$i = 1, \ldots, N_T.$$

The quantities $P(S_{j_k}|T_i^X), k=1, \ldots, N$, are the target type probabilities of the strobe track, given the information that the target type equals $T_i^X$ This is nothing else than the target type probability for target type $T_i^X$, corresponding to the strobe track $S_{j_k}$. This quantity is exactly what is produced by the target type identification scheme, when applied to the strobe tracker. The result of the computations is thus that the strobe track cross is equipped with a full target type state.

The final result has a structure where the estimated probabilities of target type $T_i^X$ for each participating strobe track are multiplied. This means that if the probability is low in one single strobe track it will also be low in the resulting strobe track cross. Consequently, only target types that have not been softly excluded in any strobe track will have a high probability in the resulting strobe track cross. This effect is illustrated in FIG. 8.

In FIG. 8, a calculation of a $2^{nd}$ order cross is illustrated. The target type probabilities are high for target types 2 and 3 for strobe track 1, and lower for target types 1 and 4. For strobe track 2, the target type probabilities are high for target type 1 and 2 and low for types 3 and 4. When the $2^{nd}$ order strobe track cross is calculated from these strobe tracks, the individual target type probabilities are multiplied. Thus, the $2^{nd}$ nd order strobe track cross will achieve a high target type probability for target type 2, since both factors are high. The probabilities for target types 1 and 3 will be somewhat lower, since they are formed from one high and one low value, and finally target type 4 will be very small, since it is the product of two small factors. In this way, it is clear that target type 2 is the main candidate for the strobe track cross.

Calculation of the quality of strobe track crosses

The quality of the strobe track cross is a measure of the probability that the cross corresponds to a true target, conditioned on the participating strobe tracks in the cross. This quantity among other things, measures how well the participating strobe tracks fit together. A calculation of the kinematic quality of a strobe track cross of arbitrary order is included in the above described MST system. When target type information is available, this quality measure can be further refined. Exactly as above this is obtained by treating the target type information separately from the kinematic information and then using the two resulting measures together to form the complete quality measure of the strobe track cross.

The evaluation of the discrete quality of a cross in discrete space corresponds to the evaluation of $$P(TX|S_{j_1}, \ldots, S_{j_N})$$

which is the probability of a true cross (TX) conditioned on all participating strobe tracks used in the computation of said cross (X). This quantity can be computed irecursively over the participating strobe tracks which is shown in the following. First apply Baye's rule $$P(TX|S_{j_1}, \ldots, S_{j_N}) = \frac{P(S_{j_1}|TX, S_{j_2}, \ldots, S_{j_N}) P(TX|S_{j_2}, \ldots, S_{j_N})}{P(S_{j_1}|S_{j_2}, \ldots, S_{j_N})} \quad (6)$$

$$= \frac{P(S_{j_1}|TX, S_{j_2}, \ldots, S_{j_N}) P(TX|S_{j_2}, \ldots, S_{j_N})}{P(S_{j_1}|TX, S_{j_2}, \ldots, S_{j_N}) P(TX|S_{j_2}, \ldots, S_{j_N}) +} $$
$$P(S_{j_1}|\neg TX, S_{j_2}, \ldots, S_{j_N}) P(\neg TX|S_{j_2}, \ldots, S_{j_N})$$

$$= \frac{P(S_{j_1}|TX, S_{j_2}, \ldots, S_{j_N}) P(TX|S_{j_2}, \ldots, S_{j_N})}{P(S_{j_1}|TX, S_{j_2}, \ldots, S_{j_N}) P(TX|S_{j_2}, \ldots, S_{j_N}) +}.$$
$$P(S_{j_1}|\neg TX, S_{j_2}, \ldots, S_{j_N})(1 - P(TX|S_{j_2}, \ldots, S_{j_N}))$$

This relation shows how to incorporate the information of one more strobe track into a probability of a true cross computed from a number of strobe tracks. To perform the integration the following two quantities need to be computed and this is done using approximate methods;

$$P(S_{j_1}|TX, S_{j_2}, \ldots, S_{j_N})$$

$$P(S_{j_1}|\neg TX, S_{j_2}, \ldots, S_{j_N}).$$

The first quantity is approximated as follows $$P(S_{j1}|TX,S_{j2},\ldots,S_{jN}) \approx P(S_{j1}|TX).$$

The dependence on other strobe tracks than the one under consideration ($S_{j1}$) is thus dropped. To proceed, note that conditioned on the fact that the cross is true, the type is one of $T_i$, i=1,...,$N_T$ (which type it is not known). Hence $$P(S_{j_1} | TX) = P(S_{j_1} | T_1^X \vee T_2^X \vee \ldots \vee T_{N_T}^X) \qquad (7)$$

$$= \frac{\sum_{i=1}^{N_T} P(S_{j_1} | T_i^X) P(T_i^X)}{\sum_{i=1}^{N_T} P(T_i^X)}$$

$$= \sum_{i=1}^{N_T} P(S_{j_1} | T_i^X) P(T_i^X)$$

using Result 2 of Appendix A and the fact that the target types form a mutually exclusive and exhaustive set of events. The end result is therefore $$P(S_{j_1} | TX, S_{j_2}, \ldots, S_{j_N}) \approx \sum_{i=1}^{N_T} P(S_{j_1} | T_i^X) P(T_i^X). \qquad (8)$$

The computation of the second quantity starts with a similar approximation, i.e $$P(S_{j1}|\neg TX,S_{j2},\ldots,S_{jN}) \approx P(S_{j1}|\neg TX).$$

Now, the strobe track has been generated in the system from several strobes so it is very likely that there is a corresponding target. The probability of the strobe track, conditioned on the fact that the cross under evaluation is not true, hence means that some of the other crosses on the considered strobe track is the correct one, or that the target is seen by one sensor only. Therefore $$P(S_{j1}|\neg TX)=P(S_{j1}|TX_1' \vee TX_2' \vee \ldots \vee TX_M' \vee Tx_M' \vee TS)$$

where $TX_k'$, k=1,...,M denote cross k of all crosses that have the strobe track under consideration as a participating strobe track, in this case $S_{j1}$. The quantity TS denotes the situation where the strobe track only points to the target in question. Since the crosses are mutually exclusive, result 2 of Appendix A can be used in order to obtain $$P(S_{j_1} | \neg TX) = P(S_{j_1} | TX_1' \vee \ldots \vee TX_M' \vee TS)$$

$$= \frac{P\sum_{k=1}^{M} P(S_{j_1} | TX_k')P(TX_k') + P(S_{j_1} | TS)P(TS)}{\sum_{k=1}^{M} P(TX_k') + P(TS)}$$

which gives the end result $$P(S_{j_1} | \neg TX, S_{j_2}, \ldots, S_{j_N}) \approx \frac{\sum_{k=1}^{M} P(S_{j_1} | TX_k')P(TX_k') + P(S_{j_1} | TS)P(TS)}{\sum_{k=1}^{M} P(TX_k') + P(TS)}. \qquad (9)$$

Here, the quantities $P(S_{j1}|TX_k')$ and $P(S_{j1}|TS)$, k=1,...,M can be computed exactly as in (8). The quantities $P(TX_k')$, k=1,...,M are the prior probabilities of a true cross. These are to be selected by the user keeping in mind that the prior probabilities of a true cross and P(TS) shall sum up to one along each strobe track (including the cross under evaluation). Examples of possibilities are to set the all equal or equal to P(order(X)) i.e. to a quantity that depend on the order of the cross. In this way higher order crosses could be further favored. As an other alternative, a dependence on the geographical location of the cross could be introduced. The quantity P(TS) is the prior probability that the strobe track corresponds only to a direction. Also this quantity is at the users disposal.

All procedures necessary to update the quality of a cross X to include the information of the strobe track $S_{j1}$ is now available. At the beginning the quantity $P(TX|S_{j2},\ldots,S_{jN})$ is available from previous iterations, performed exactly as the last one. The target type probabilities of the cross under evaluation is available from the calculation of crosses described above. The target type probabilities of the crosses, in which the strobe track $S_{j1}$ participates, are also available. The prior probabilities $P(TX_k')$ and P(TS) are also available.

The inclusion of the information of the strobe track is then as follows. First $P(S_{j1}|TX,S_{j2},\ldots,S_{jN})$ is computed according to (8). Then $P(S_{j1}|TX_k')$, k=1,...,M are computed using the technique of (7). Then $P(S_{j1}|\neg TX,S_{j2},\ldots,S_{jN})$ can be evaluated using the prior probabilities. All quantities are now available for the computation of $P(TX|S_{j1},\ldots,S_{jN})$ said computation being performed according to (6).

So far only the inclusion of the final strobe track in the cross quality has been described Since the inclusion is formulated recursively, a recursive computation scheme can now be formulated for the full evaluation of the cross quality. It is assumed that all crosses has been computed as described above. It will be obvious for anyone skilled in the art that the recursive cross quality computation can be formulated as follows;

1. (Prerequisites): Select prior cross probabilities, P(TX), for all existing crosses and P(TS) for all existing strobe tracks.

2. (Evaluation of the quality of cross X, $P_Q(TX|S_{j1},\ldots,S_{jN})$):

$P_Q(TX|\emptyset)=P(TX)$ ($\emptyset$ denotes the empty set)

For m=1,...,N repeat (N is the number of participating strobe tracks)

$$P(S_{j_m} | TX, S_{j_{m-1}}, \ldots, S_{j_1}) = \sum_{i=1}^{N_T} P(S_{j_m} | T_i^X)(T_i^X)$$

for k=1,...,M repeat (loop is over crosses that have $S_{jm}$ participating)

$$P(S_{j_m} \mid TX_k^l) = \sum_{i=1}^{N_T} P\left(S_{j_m} \mid T_i^{X_k^l}\right)\left(T_i^{X_k^l}\right)$$

end $$P(S_{j_m} \mid \neg TX, S_{j_{m-1}}, \ldots, S_{j_1}) = \frac{\sum_{k=1}^{M} P(S_{j_m} \mid TX_k^l)P(TX_k^l) + P(S_{j_m} \mid TS_{j_m})P(TS_{j_m})}{\sum_{k=1}^{M} P(TX_k^l) + P(TS_{j_m})}$$

$$\text{NORMALIZATION} = P(S_{j_m} \mid TX, S_{j_{m-1}}, \ldots, S_{j_1})$$
$$P(TX \mid S_{j_{m-1}}, \ldots, S_{j_1}) +$$
$$P(S_{j_m} \mid \neg TX, S_{j_{m-1}}, \ldots, S_{j_1})$$
$$(1 - P(TX \mid S_{j_{m-1}}, \ldots, S_{j_1}))$$

$$P_Q(TX \mid S_{j_m}, \ldots, S_{j_1}) = \frac{P(S_{j_m} \mid TX, S_{j_{m\!l}}, \ldots, S_{j_1}) P(TX \mid S_{j_{m-1}}, \ldots, S_{j_1})}{\text{NORMALIZATION}}$$

end

It is obvious to anyone skilled in the art that the above scheme can be simplified further by neglecting different dependencies.

The cross quality computation can be combined with corresponding kinematic cross quality computations, e.g. in the preferred multi-sensor multi-target tracking system described above. The combination can then be further used in the procedure for automatic track initiation in that system. The combined cross quality computation can for example be performed by assuming independence between the kinematics and the target type information, which leads to a multiplication of the kinematic cross quality and the cross quality described in this invention. This combination is expected to give significant improvements in the suppression of ghost targets. This effect is illustrated in FIGS. 10*a* and 10*b*.

Note that the quality measuring quantities computed according to (7) and (8) will be high only if at least one target type has the property that both the probability of the strobe track and the probability of the strobe track cross is high. Otherwise a low quality will result. This is desirable, since if there were no target type with the above property, then the computed strobe track cross would be inconsistent with the information of this participating strobe track. This effect is illustrated in FIGS. 9*a* and *b*, where FIG. 9*a* shows consistency and FIG. 9*b* shows inconsistency.

In FIG. 9*a*, a strobe track 1 has a high probability for two of the target types, namely type 2 and 3. The $2^{nd}$ order strobe track cross have only a high probability for the target type 2. However, this is enough to produce a high strobe track cross quality, since target type 2 also had a high probability in the strobe track 1. In FIG. 9*b*, the same strobe track is used. Here, another $2^{nd}$ order strobe track cross is considered, which have a high probability only for target type 1. In this case, the strobe track cross quality will be low, since there is no agreement between the probability magnitudes.

To further illustrate the operation of the recursive cross quality evaluation discussed above an example is given with reference to FIGS. 10*a* and 10*b*.

EXAMPLE 5

In FIG. 10*a* a target tracking system without target type information is shown. Without target type probability estimates of the strobe tracker, there is no way to distinguish between true and ghost targets in this 2 sensor scenario with azimuthal only strobe tracks. All crosses are equally good. In FIG. 10*b* a target tracking system with target type information is shown. Here three true targets, denoted by arrow symbols, are tracked by 2 sensors S1 and S2 that each sees all targets. As can be seen there are 8 crosses, denoted by open circles, whose quality needs to be evaluated. These are given the numbers 1 to 8 with the numbering running from left to right for each row and then from bottom to top. With this numbering the true crosses have numbers 4 ($T_1$), 5 ($T_2$) and 6 ($T_3$). Target number 1 thus has true type $T_1$ target number 2 has true type $T_2$ and target number 3 has true type $T_3$. The strobe tracks of each sensor are numbered clockwise starting with sensor 1 (S1). The strobe tracks are thus numbered from 1 to 6. There are three possible target types in the scenario. The starting point is the following target type probabilities for each strobe track;

$$S_1: \begin{bmatrix} 0.6 \\ 0.2 \\ 0.2 \end{bmatrix} \quad S_2: \begin{bmatrix} 0.2 \\ 0.6 \\ 0.2 \end{bmatrix} \quad S_3: \begin{bmatrix} 0.2 \\ 0.2 \\ 0.6 \end{bmatrix} \quad S_4: \begin{bmatrix} 0.8 \\ 0.1 \\ 0.1 \end{bmatrix} \quad S_5: \begin{bmatrix} 0.1 \\ 0.8 \\ 0.1 \end{bmatrix} \quad S_6: \begin{bmatrix} 0.1 \\ 0.1 \\ 0.8 \end{bmatrix}.$$

Using the final result above to compute the crosses (all prior target type probabilities are chosen equal, i.e, $P(T_i^X)=\frac{1}{3}$) gives $$X_1: \begin{bmatrix} 0.6667 \\ 0.0833 \\ 0.2500 \end{bmatrix} \quad X_2: \begin{bmatrix} 0.6667 \\ 0.2500 \\ 0.0833 \end{bmatrix} \quad X_3: \begin{bmatrix} 0.0833 \\ 0.6667 \\ 0.2500 \end{bmatrix} \quad X_4: \begin{bmatrix} 0.9231 \\ 0.0385 \\ 0.0385 \end{bmatrix}$$

$$X_5: \begin{bmatrix} 0.0385 \\ 0.9231 \\ 0.0385 \end{bmatrix} \quad X_6: \begin{bmatrix} 0.0385 \\ 0.0385 \\ 0.9231 \end{bmatrix} \quad X_7: \begin{bmatrix} 0.2500 \\ 0.6667 \\ 0.0833 \end{bmatrix} \quad X_8: \begin{bmatrix} 0.0833 \\ 0.2500 \\ 0.0667 \end{bmatrix}$$

The quality of the crosses are then evaluated. It is assumed that the following values are used P(TX)=0.25; P(TS)=0.25 for strobe tracks with three crosses.

P(TX)=0.33; P(TS)=0.33 for strobe tracks with two crosses.

This resulted in the following values of $P(TX|S_{j1},S_{j2})$ when the recursions where run $X_1$:0.1649

$X_2$:0.1649

$X_3$:0.1649

$X_4$:0.4898

$X_5$:0.4059

$X_6$:0.4997

$X_7$:0.2039

$X_8$:0.2169

For each cross the strobe track with the least number of crosses was included first. Clearly, the correct targets are detected by the method according to the invention.

Even if the above examples all refer to one particular described MST system, the target type estimation method according to the present invention may be used in other tracking systems as well. The method is applicable in all cases where tracks of different types are formed and/or where these tracks are used to create other related quantities. The discrete information may in this sense be integrated in many type of situations. The scope of the present invention is solely determined by the attached claims.

Appendix: Basic Results and the Calculation of the Discrete Probability Function Result 1: Let the events A and B be mutually exclusive and let z be a measurement. Then $$P(z\mid A\vee B)=\frac{P(z\mid A)P(A)+P(z\mid B)P(B)}{P(A)+P(B)}.$$

Proof:

$$P(z\mid A\vee B)=\frac{P(z,(A\vee B))}{P(A\vee B)}$$
$$=\frac{P(z,A\vee z,B)}{P(A)+P(B)-P(A,B)}$$
$$=\frac{P(z,A)+P(z,B)-P(z,A,z,B)}{P(A)+P(B)-P(A,B)}$$
$$=\frac{P(z,A)+P(z,B)}{P(A)+P(B)}$$
$$=\frac{P(z\mid A)P(A)+P(z\mid B)P(B)}{P(A)+P(B)}.$$

This results can be easily generalized to cover an arbitrary number of mutually exclusive events. The result is then Result 2: Let the events $\{A_n\}_{n=1}^N$ be mutually exclusive and let z be a measurement. Then $$P(z\mid A_1\vee A_2\vee\ldots\vee A_n)=\frac{\sum_{n=1}^N P(z\mid A_n)P(A_n)}{\sum_{n=1}^N P(A_n)}.$$

The above results are useful in the calculation of cross qualities.

The case where the two latest measurement outcomes are retained in the target tracking process is now discussed. The discrete probability function then becomes (it is only known that the target type is one of $T_i$, i=1, ..., $N_T$.)

$$f_D(t_q,p,n)=P(t_q,z^p(t_q)\mid\{T_1^n\vee\ldots\vee T_{N_T}^n\},Z^n(t_{q-1}))$$
$$=\frac{P(t_q,z^p(t_q),\{T_1^n\vee\ldots\vee T_{N_T}^n\},Z^n(t_{q-1}))}{P(t_q,\{T_1^n\vee\ldots\vee T_{N_T}^n\},Z^n(t_{q-1}))}$$
$$=P(t_q,z^p(t_q)\mid\{T_1^n\vee\ldots\vee T_{N_T}^n\},z^n(t_{q-1})Z^n(t_{q-2}))\times$$
$$P(t_q,z^p(t_{q-1})\mid\{T_1^n\vee\ldots\vee T_{N_T}^n\},Z^n(t_{q-2}))\times$$
$$\frac{P(t_q,\{T_1^n\vee\ldots\vee T_{N_T}^n\},Z^n(t_{q-2}))}{P(t_q,\{T_1^n\vee\ldots\vee T_{N_T}^n\},Z^n(t_{q-1}))}.$$

$Z^n(t_{q-1})$ highlights the fact that only previous measurements associated to the track in question are considered. By the same motivation as earlier the quotient of the last factor in the last equation should tend to 1 as q increases. Hence, using the fact that the target types are a set of mutually exclusive and exhaustive gives $$f_D(t_q,p,n)\approx\frac{P(t_q,z^p(t_q),\{T_1^n\vee\ldots T_{N_T}^n\},z^n(t_{q-1}),Z^n(t_{q-2}))}{P(t_q,\{T_1^n\vee\ldots T_{N_T}^n\},z^n(t_{q-1}),Z^n(t_{q-2}))}\times$$
$$\frac{P(t_q,z^p(t_{q-1}),\{T_1^n\vee\ldots T_{N_T}^n\},Z^n(t_{q-2}))}{P(t_q,\{T_1^n\vee\ldots T_{N_T}^n\},Z^n(t_{q-2}))}$$
$$\approx\frac{P(t_q,z^p(t_q),\{T_1^n\vee\ldots\vee T_{N_T}^n\},z^n(t_{q-1}),Z^n(t_{q-1}))}{P(t_q,\{T_1^n\vee\ldots\vee T_{N_T}^n\},Z^n(t_{q-1}))}$$

$$\sum_{i_1=1}^{N_T}P(t_q,z^p(t_q)\mid T_{i_1}^n,z^n(t_{q-1}),Z^n(t_{q-1}))$$
$$P(t_q,z^p(t_{q-1})\mid T_{i_1}^n,Z^n(t_{q-1}))$$
$$=\frac{P(t_q,T_{i_1}^n\mid Z^n(t_{q-1}))P(Z^n(t_{q-1}))}{\sum_{i_1=1}^{N_T}P(t_q,T_{i_1}^n\mid Z^n(t_{q-1}))P(Z^n(t_{q-1}))}$$

$$\sum_{i_1=1}^{N_T}P(t_q,z^p(t_q)\mid T_{i_1}^n,z^n(t_{q-1}),Z^n(t_{q-1}))$$
$$P(t_q,z^p(t_{q-1})\mid T_{i_1}^n,Z^n(t_{q-1}))$$
$$=\frac{P(t_q,T_{i_1}^n\mid Z^n(t_{q-1}))}{\sum_{i_1=1}^{N_T}P(t_q,T_{i_1}^n\mid Z^n(t_{q-1}))}$$

$$\approx\sum_{i=1}^{N_T}P(t_q,z^p(t_q)\mid T_i^n,z^n(t_{q-1}))P(t_q,z^n(t_{q-1})\mid T_i^n)$$
$$P(t_q,T_i^n\mid Z^n(t_{q-1})).$$

Thus a relatively simple sum results. The measurements are now given by $$z^p(t_q)=M_q^p,\ z^n(t_{q-1})=M_{q-1}^n.$$

This givens the following final result $$f_D(t_q,p,n)=\sum_{i=1}^{N_T}P(t_q,M_q^p\mid T_i^n,M_{q-1}^n)P(t_q,M_{q-1}^n\mid T_i^n)$$
$$P(t_q,T_i^n\mid Z^n(t_{q-1}))$$

What is claimed is:

1. A target type estimation method for estimation of target types in a tracking system, using discrete information from measurements, said target type estimation method operating in a target type system comprising a number $N_T$ of target types and a number $N_M$ of measurement outcomes, where each target type has a relation to at least one of said measurement outcomes and where each measurement outcome has a relation to at least one of said target types, said target type estimation method comprises an update step including a time recursive calculation of target type probabilities, comprising the steps of:

calculating probabilities ($P(t_q,T_i|Z(t_{q-1}))$) at a certain time ($t_q$) that a track is of said target type ($T_i$, i=1, ..., $N_T$), using measurements ($Z(t_{q-1})$) at a previous time ($t_{q-1}$);

calculating the likelihood ($P(t_q,z(t_q)|T_i,Z(t_{q-1}))$) for a certain measurement ($z(t_q)$) given the target type and the measurements up to said previous time; and calculating probabilities ($P(t_q,T_i|Z(t_q))$) that a track is of said target type at the present time from said probabilities ($P(t_q,T_i|Z(t_{q-1}))$) that a track is of said target type at a previous time ($t_{q-1}$) and said likelihood ($P(t_q,z(t_q)|T_i,Z(t_{q-1}))$); characterised in that said update step further comprises the steps of:

approximating said likelihood ($P(t_q,z(t_q)|T_i,Z(t_{q-1}))$) from a reduced number of parameters; and restoring ambiguity in said likelihood approximation in cases where at least two target types have relations to a different number of measurement outcomes and at least one measurement outcome has a relation to at least two of said target types.

2. A target type estimation method according to claim 1, characterised in that said calculation of said probabilities ($P(t_q,T_i|Z(t_q))$) that a track is of said target type at the present time is based on products of said probabilities ($P(t_q,T_1|Z(t_{q-1}))$) that a track is of said target type at a previous time ($t_{q-1}$) and said likelihood ($P(t_q,z(t_q)|T_i,Z(t_{q-1}))$).

3. A target type estimation method according to claim 1, characterised in that said calculation of said probabilities ($P(t_q,T_i|Z(t_q))$) that a track is of said target type at the present time is based on the following:

$$P(t_q, T_i | Z(t_q)) = \frac{P(t_q, z(t_q) | T_i, Z(t_{q-1}))P(t_q, T_i | Z(t_{q-1}))}{\sum_{i=1}^{N_T} P(t_q, z(t_q) | T_i, Z(t_{q-1}))P(t_q, T_i | Z(t_{q-1}))},$$

$$p(t_o, T_i | Z(t_o)) = P_i^o, \text{ for } i = 1, \ldots, N_T,$$

where $P_i^o$ are the prior target type probabilities.

4. A target type estimation method according to claim 3, characterised in that said approximation comprises the step of neglecting all but a fixed number of the previous measurements in the calculation of said likelihood.

5. A target type estimation method according to claim 4, characterised in that said approximation comprises the step of neglecting all previous measurements except the two last measurements in the calculation of said likelihood.

6. A target type estimation method according to claim 1, characterised in that said ambiguity restoring comprises the further steps of:
determining probabilities for a designing target type ($T_D$); and
using said probabilities obtained for a designing target type ($T_D$) as probabilities for target types presenting an ambiguity of measurement outcomes.

7. A target type estimation method according to claim 6, in which said target type system is defined by a target type system matrix $\Delta^{TM}$, in which target types are running along the columns, the measurement outcomes along the rows and in which a relation between a target type and a measurement outcome is defined with 1 and a non-existing relation with 0; characterised by in said update step approximating said likelihood ($P(t_q,z(t_q)|T_i,Z(t_{q-1}))$) based on said matrix $\Delta^{TM}$.

8. A target type estimation method according to claim 7, characterised by in said update step approximating said likelihood ($P(t_q,z(t_q)|T_i,Z(t_{q-1}))$) based on one single parameter and said matrix $\Delta^{TM}$.

9. A target type estimation method according to claim 8, characterised by in said update step approximating said likelihood ($P(t_q,z(t_q)|T_i,Z(t_{q-1}))$) as a product of two factors, where the first factor is given by a parameter representing the probability of correct detection ($P_C$) in cases where both the measurements $z(t_q)$ and $z(t_{q-1})$ are equal and consistent with the target type ($T_i$), by a parameter representing the probability of erroneous detection ($P_E$) in cases where the measurement $z(t_{q-1})$ is consistent with the target type ($T_i$), and the measurement $z(t_q)$ is different from the measurement $z(t_{q-1})$, by said parameter ($P_E$) in cases where the measurement $z(t_{q-1})$ is inconsistent with the target type ($T_i$) and where the measurement $z(t_q)$ also is inconsistent with the target type ($T_1$), and by a parameter ($P_1$) representing the probability of a consistent detection for the designing target type ($T_D$) in cases where the measurement $z(t_{q-1})$ is inconsistent with the target type ($T_i$) and where the measurement $z(t_q)$ is consistent with the target type ($T_i$), and where the second factor is given by said parameter ($P_1$) when the measurement $z(t_{q-1})$ is consistent with the target type ($T_i$), by said parameter ($P_E$) when the measurement $z(t_{q-1})$ is inconsistent with the target type ($T_1$), whereby $$P_E = \frac{1 - P_C}{N_M - 1}$$

and $$P_I = \frac{N_M - 1 - (N_M - N_M(d))(1 - P_C)}{N_M(d)(N_M - 1)},$$

where $N_M(d)$ denotes the number of measurement outcomes for said designing target $T_D$, whereby one of said parameters ($P_C, P_E, P_1$) constitutes said single parameter.

10. A target type estimation method according to claim 9, characterised by in said update step approximating said likelihood by the product:

$$(P(t_q,z(t_q)|T_i,Z(t_{q-1}))=(P(t_q,M_q|T_i,M_{q-1})(P(t_q,M_{q-1}|T_1), i=1, \ldots, N_T$$

where the measurement $z(t_q)$ is given by the measurement outcome ($M_q$) and where the measurement $z(t_{q-1})$ is given by the measurement outcome ($M_{q-1}$) and where the factors of said product are given by:

$$P(t_q,M_{q-1}|T_i)=P_E+(P_1-P_E)\cdot\Delta_{iM_{q-1}}{}^{TM}$$

for $i=1, \ldots, N_T, M_{q-1}=1, \ldots, N_M$
where the subscripts $i_1$ and $i_2$ denotes the row $i_1$ and column $i_2$, respectively, of a matrix,
and where $$P(t_q,M_q|T_i,M_{q-1})=(P_C-P_E)\cdot\delta_{M_qM_{q-1}}\cdot\Delta_{iM_q}{}^{TM}\cdot\Delta_{iM_{q-1}}{}^{TM}+$$
$$P_1\cdot\Delta_{iM_q}{}^{TM}\cdot(1-\Delta_{iM_{q-1}}{}^{TM})++P_E(\Delta_{iM_{q-1}}{}^{TM}+(1-\Delta_{iM_q}{}^{TM})\cdot(1-\Delta_{iM_{q-1}}{}^{TM})),$$

for $i=1, \ldots, N_T, M_q=1, \ldots, N_M, M_{q-1}=1, \ldots, N_M$ and where $\delta_{M_qM_{q-1}}$ is a Kronecker delta function.

11. A target type estimation method according to claim 1, characterised by using detected ESM emitter modes as measurements.

12. A target type estimation method according to claim 1, characterised by using detected ESM emitters as measurements.

13. A target type estimation method according to claim 1, characterised by using detected ESM target types as measurements.

14. A target type estimation method according to claim 1, characterised by using IRST information as measurements.

15. A target type estimation method according to claim 1, characterised by using outcomes from more than one type of measurements, whereby the different target type probabilities are based on at least two of the available types of measurements.

16. A target type estimation method according to claim 15, characterised by using measurements of at least one of ESM emitter modes, ESM emitters, ESM target types, IRST information and direct observations.

17. A target type estimation method according to claim 1, characterised in that said method further comprises the step of time propagation of target type probabilities to the time of the next measurement.

18. A target type estimation method according to claim 17, characterised in that said time propagation of target type probabilities is performed according to:

$$P(t_q,T_i|Z(t_{q-1})=P_i^o+(P(t_{q-1},T_i|Z(t_{q-1}))-P_i^o)e^{-(t_q-t_{q-1})/\tau}$$

for i=1, . . . ,$N_T$, where τ is the decay time.

19. A target type estimation method according to claim 1, characterised by using said target type estimation method in a strobe track.

20. A target type estimation method according to claim 1, characterised by using said target type estimation method in a system track.

21. A target tracking method, characterised in that it comprises the step of calculating the goodness of fit between discrete target type related measurements ($z(t_q)$) and related estimated target type probabilities, said target tracking method operating in a target type system comprising a number $N_T$ of target types and a number $N_M$ of measurement outcomes, where each target type has a relation to at least one of said measurement outcomes and where each measurement outcome has a relation to at least one of said target types, said step of calculating the goodness of fit comprises the step of calculating a discrete probability measurement function ($f_D(t_q,p,n)$), where p refers a particular measurement and n, to a particular track, where $$f_D(t_q,p,n)=P(t_q,z^p(t_q)|\{T_1{}^nV \ldots VT_{N_T}{}^n\},Z^n(t_{q-1})),$$

said step of calculating said discrete probability measurement function ($f_D(t_q,p,n)$), comprises the step of approximating said discrete probability measurement function ($f_D(t_q,p,n)$) from a reduced number of measurements.

22. A target tracking method according to claim 21, characterised in that said approximation comprises the step of neglecting all but a fixed number of the previous measurements in the calculation of said discrete probability measurement function ($f_D(t_q,p,n)$).

23. A target tracking method according to claim 22, characterised in that said approximation comprises the step of neglecting all previous measurements except the two last measurements in the calculation of said discrete probability measurement function ($f_D(t_q,p,n)$).

24. A target tracking method according to claim 23, characterised in that said step of calculating the goodness of fit comprises the step of approximating said discrete probability measurement function ($f_D(t_q,p,n)$) as a sum of products of three factors, according to $$f_D(t_q, p, n) = \sum_{i=1}^{N_T} P(t_q, M_q^p \mid T_i^n, M_{q-1}^n)P(t_q, M_{q-1}^n \mid T_i^n)$$
$$P(t_q, T_i^n \mid Z^n(t_{q-1})),$$

where the first factor is given by a parameter representing the probability of correct detection ($P_C$) in cases where both the measurement outcomes ($M_q^p$, $M_{q-1}^n$) are equal and consistent with the target type ($T_i$), by a parameter representing the probability of erroneous detection ($P_E$) in cases where the measurement outcome $M_{q-1}{}^n$, is consistent with the target type ($T_i$), and the measurement outcome $M_q^p$ is different from the measurement outcome $M_{q-1}{}^n$, by said parameter ($P_E$) in cases where the measurement outcome $M_{q-1}{}^n$ is inconsistent with the target type ($T_i$) and where the measurement outcome $M_q^p$ also is inconsistent with the target type ($T_i$), and by a parameter ($P_1$) representing the probability of a consistent detection for the designing target type ($T_D$) in cases where the measurement outcome $M_{q-1}{}^n$ is inconsistent with the target type ($T_i$) and where the measurement outcome $M_q^p$ is consistent with the target type ($T_i$), where the second factor is given by said parameter ($P_1$) when the measurement outcome $M_{q-1}{}^n$ is consistent with the target type ($T_i$), by said parameter ($P_E$) when the measurement outcome $M_{q-1}{}^n$ is inconsistent with the target type ($T_i$), and where the third factor is the estimated target type probability of target type ($T_i$) of track n, whereby $$P_E = \frac{1-P_C}{N_M - 1}$$

and $$P_I = \frac{N_M - 1 - (N_M - N_M(d))(1-P_C)}{N_M(d)(N_M - 1)},$$

where $N_M(d)$ denotes the number of measurement outcomes for said designing target $T_D$, whereby one of said parameters ($P_C$, $P_E$, $P_I$) is selectable by the user.

25. A target tracking method according to claim 21, characterised in that it further comprises the step of associating a discrete measurement ($z(t_q)$) to a track, comprising the step of calculating the goodness of fit between said discrete measurement ($z(t_q)$) and related estimated target type probabilities of said track, based on the results from the step of calculating a discrete probability measurement function ($f_D(t_q,p,n)$).

26. A target tracking method according to claim 25, characterised in that said associating step comprises at least one of the steps of:

- extending each track with a discrete state comprising target type probabilities;
- updating and propagating each track to the next measurement time;
- computing a discrete probability function ($f_D(t_q,p,n)$) for any measurement to track association; and
- calculating an association quality quantity for each measurement to track association based on said discrete probability function ($f_D(t_q,p,n)$).

27. A target tracking method according to claim 26, characterised in that said associating step comprises the step of:

calculating an association quality quantity for each measurement to track association based on both said discrete probability function ($f_D(t_q,p,n)$) and a kinematic only probability density function ($f_k(t_q,p,n)$).

28. A target tracking method according to claim 26, characterised in that said associating step comprises the step of:

calculating an association quality quantity for each measurement to track association comprising a logarithmic probability quotient (LPQ).

29. A target tracking method according to claim 28, characterised in that said logarithmic probability quotient (LPQ) is calculated according to:

$$LPQ = \begin{bmatrix} lpq(t_{q1}, 1, 1) & \cdots & lpq(t_{q1}, 1, N) \\ \vdots & \ddots & \vdots \\ lpq(t_{q1}, P, 1) & \cdots & lpq(t_{qP}, P, N) \end{bmatrix}$$

where $$lpq(t_q, p, n) = \log\left(\frac{P_D P(TT) f_K(t_q, p, n) f_D(t_q, p, n)}{P_S(1 - P_D P(TT))}\right)$$

where $P_D$ is the probability of detection of the sensor, $P_S$ is the probability of false alarm of the sensor and P(TT) is the probability that the track corresponds to a true target.

30. A target tracking method according to claim 21, characterised by the step of associating a discrete measurement ($z(t_q)$) to a strobe track.

31. A target tracking method according to claim 21, characterised by the step of associating a discrete measurement ($z(t_q)$) to a system track.

32. A target tracking method according to claim 21, characterised by the step of calculating a track quality.

33. A target tracking method according to claim 32, characterised by the step of calculating a track quality using said discrete probability function ($f_D(t_q,p,n)$).

34. A target tracking method according to claim 33, characterised by the step of calculating a track quality using both said discrete probability function ($f_D(t_q,p,n)$) and a kinematic only probability density function ($f_K(t_q,p,n)$).

35. A target tracking method according to claim 34, characterised by the step of calculating a track quality according to:

$$P(TT, t_q) = \frac{1}{1 + \frac{P_S}{P_D f_K(t_q, p, n) f_D(t_q, p, n) + (1 - P_D)P_S} \frac{1 - P(TT, t_{q-1})}{P(TT, t_{q-1})}}$$

when a measurement is obtained during the scan and according to:

$$P(TT, t_q) = \frac{1}{1 + \frac{P_S}{1 - P_D} \frac{1 - P(TT, t_{q-1})}{P(TT, t_{q-1})}}$$

when no measurement is obtained during the scan.

36. A target tracking method according to claim 32, characterised by the step of evaluating said track quality in multiple hypothesis tracking.

37. A target tracking method according to claim 1, characterised in that target type probabilities are calculated according to a target type estimation method for estimation of target types in a tracking system, using discrete information from measurements, said target type estimation method operating in a target type system comprising a number $N_T$ of target types and a number $N_M$ of measurement outcomes, where each target type has a relation to at least one of said measurement outcomes and where each measurement outcome has a relation to at least one of said target types, said target type estimation method comprises an update step including a time recursive calculation of target type probabilities, comprising the steps of:

calculating probabilities ($P(t_q,T_i|Z(t_{q-1}))$) at a certain time ($t_q$) that a track is of said target type ($T_1$, i=1, ... ,$N_T$), using measurements ($Z(t_{q-1})$) at a previous time ($t_{q-1}$);

calculating the likelihood ($P(t_q,z(t_q)|T_1,Z(t_{q-1}))$) for a certain measurement ($z(t_q)$) given the target type and the measurements up to said previous time; and calculating probabilities ($P(t_q,T_i|Z(t_{q-1}))$) that a track is of said target type at the present time from said probabilities ($P(t_q,T_1|Z(t_{q-1}))$) that a track is of said target type at a previous time ($t_{q-1}$) and said likelihood ($P(t_q,z(t_q)|T_i,Z(t_{q-1}))$);

approximating said likelihood ($P(t_q,z(t_q)|T_1,Z(t_{q-1}))$) from a reduced number of parameters; and restoring ambiguity in said likelihood approximation in cases where at least two target types have relations to a different number of measurement outcomes and at least one measurement outcome has a relation to at least two of said target types.

38. A cross calculation method, characterised in that it comprises the step of calculating the target type probabilities ($P(T_i^X|S_{j1}, \ldots, S_{jN})$, i=1, ... , $N_T$) of a cross (X) consisting of a subset of all available strobe tracks ($S_{j1}, \ldots, S_{jN}$), the number of strobe track being at least two, according to:

$$P(T_i^X | S_{j_1}, \ldots, S_{j_N}) = \frac{(P(T_i^X))^N \prod_{k=1}^{N} P(S_{j_k} | T_i^X)}{\sum_{i=1}^{N_T} (P(T_i^X))^N \prod_{k=1}^{N} P(S_{j_k} | T_i^X)},$$

$i = 1, \ldots, N_T$.

where the quantities ($P(S_{jk)|Ti}^X)$, k=1, ... , N, are the target type probabilities of the strobe track and where ($P(T_i^X)$), k=1, ... , N, are the prior target type probabilities of the cross.

39. A cross calculation method according to claim 38, characterised by the step of calculating a discrete quality of the cross (X), said discrete quality being the probability of a true cross conditioned on all participating strobe tracks ($P(TX|S_{j1}, \ldots ,S_{jN})$) used in the computation of said cross.

40. A cross calculation method according to claim 39, characterised in that the inclusion of an additional strobe track in said discrete quality is performed according to:

$$P(TX | S_{j_1}, \ldots, S_{j_N}) =$$

$$\frac{P(S_{j_1} | TX, S_{j_2}, \ldots, S_{j_N}) P(TX | S_{j_2}, \ldots, S_{j_N})}{P(S_{j_1} | TX, S_{j_2}, \ldots, S_{j_N}) P(TX | S_{j_2}, \ldots, S_{j_N}) + P(S_{j_1} | \neg TX, S_{j_2}, \ldots, S_{j_N})(1 - P(TX | S_{j_2}, \ldots, S_{j_N}))}$$

and where the following approximations are used:

$P(S_{j1}|TX,S_{j2}, \ldots ,S_{jN})=P(S_{j1}|TX)$ $P(S_{j1}|\neg TX,S_{j2}, \ldots ,S_{jN})=P(S_{j1}|\neg TX)$.

41. A cross calculation method according to claim 40, characterised in that the calculation of said discrete quality is performed according to the following steps:

1. selecting prior cross probabilities ($P(TX)$) for all existing crosses and prior strobe track probabilities ($P(TS)$) for all existing strobe tracks, said prior cross probabilities and said prior strobe track probabilities summing up to one along each strobe track;

2. evaluating the quality of cross (X), ($P_Q(TX|S_{j1}, \ldots, S_{jN})$):

calculating $P_Q(TX|\emptyset)=P(TX)$, where $\emptyset$ denotes the empty set;

repeating the steps of:

calculating $P(S_{j_m} | TX, S_{j_{m-1}}, \ldots, S_{j_1}) = \sum_{i=1}^{N_T} P(S_{j_m} | T_i^X) P(T_i^X)$ calculating $P(S_{j_m} | TX_k^l) = \sum_{i=1}^{N_T} P\left(S_{j_m} \big| T_i^{X_k^l}\right) P\left(T_i^{X_k^l}\right)$ for $k = 1, \ldots, M$ -continued $$\text{calculating } P(S_{j_m} \mid \neg TX, S_{j_{m-1}}, \ldots, S_{j_1}) = \frac{\sum_{k=1}^{M} P(S_{j_m} \mid TX'_k) P(TX'_k) + P(S_{j_m} \mid TS_{j_m}) P(TS_{j_m})}{\sum_{k=1}^{M} P(TX'_k) + P(TS_{j_m})}$$

$$\text{calculating NORMALIZATION} = P(S_{j_m} \mid TX, S_{j_{m-1}}, \ldots, S_{j_1})$$
$$P(TX \mid S_{j_{m-1}}, \ldots, S_{j_1}) +$$
$$P(S_{j_m} \mid \neg TX, S_{j_{m-1}}, \ldots, S_{j_1})$$
$$(1 - P(TX \mid S_{j_{m-1}}, \ldots, S_{j_1}))$$

$$\text{calculating } P_Q(TX \mid S_{j_m}, \ldots, S_{j_1}) = \frac{P(S_{j_m} \mid TX, S_{j_{m_I}}, \ldots, S_{j_1}) P(TX \mid S_{j_{m-1}}, \ldots, S_{j_1})}{\text{NORMALIZATION}}$$

for m=1, . . . ,N, where $P(TX'_k)$ is a prior probability of a true cross.

42. A system for target tracking, characterised by a cross calculation step, comprising the step of:

calculating the target type probabilities $P(T_i^N \mid S_{j_1}, \ldots, S_{j_N})$, i=1, . . . ,$N_T$) of a cross (X) consisting of a subset $S_{j_1}, \ldots, S_{j_N}$) of all available strobe tracks, the number of strobe tracks being at least two, according to:

$$P(T_i^X \mid S_{j_1}, \ldots, S_{j_N}) = \frac{(P(T_i^X))^N \prod_{k=1}^{N} P(S_{j_k} \mid T_i^X)}{\sum_{i=1}^{N_T} (P(T_i^X))^N \prod_{k=1}^{N} P(S_{j_k} \mid T_i^X)},$$

$i = 1, \ldots, N_T$.

where the quantities $P(S_{jk} \mid T_i^X)$, k=1, . . . ,N, are the target type probabilities of the strobe track and where $P(T_i^X)$, k=1, . . . ,N, are the prior target type probabilities of the cross;

calculating of a discrete quality ($P_Q(TX \mid S_{j_1}, \ldots, S_{j_N})$), of a cross (X), said discrete quality being the probability of a true cross conditioned on the strobe tracks that are participating in said cross (X);

calculation of said discrete quality is performed according to the following steps:

1. selecting prior cross probabilities (P(TX)) for all existing crosses and prior strobe track probabilities (P(TS)) for all existing strobe tracks, said prior cross probabilities and said prior strobe track probabilities summing up to one along each strobe track;

2. evaluating the quality of cross (X),($P_Q(TX \mid S_{j_1}, \ldots, S_{j_N})$):

calculating $P_Q(TX \mid \emptyset) = P(TX)$, where $\emptyset$ denotes the empty set;

repeating the steps of:

$$\text{calculating } P(S_{j_m} \mid TX, S_{j_{m-1}}, \ldots, S_{j_1}) = \sum_{i=1}^{N_T} P(S_{j_m} \mid T_i^X) P(T_i^X)$$

$$\text{calculating } P(S_{j_m} \mid TX'_k) = \sum_{i=1}^{N_T} P\left(S_{j_m} \mid T_i^{X'_k}\right) P\left(T_i^{X'_k}\right) \text{ for } k = 1, \ldots, M$$

-continued $$\text{calculating } P(S_{j_m} \mid \neg TX, S_{j_{m-1}}, \ldots, S_{j_1}) = \frac{\sum_{k=1}^{M} P(S_{j_m} \mid TX'_k) P(TX'_k) + P(S_{j_m} \mid TS_{j_m}) P(TS_{j_m})}{\sum_{k=1}^{M} P(TX'_k) + P(TS_{j_m})}$$

$$\text{calculating NORMALIZATION} = P(S_{j_m} \mid TX, S_{j_{m-1}}, \ldots, S_{j_1})$$
$$P(TX \mid S_{j_{m-1}}, \ldots, S_{j_1}) +$$
$$P(S_{j_m} \mid \neg TX, S_{j_{m-1}}, \ldots, S_{j_1})$$
$$(1 - P(TX \mid S_{j_{m-1}}, \ldots, S_{j_1}))$$

$$\text{calculating } P_Q(TX \mid S_{j_m}, \ldots, S_{j_1}) = \frac{P(S_{j_m} \mid TX, S_{j_{m_I}}, \ldots, S_{j_1}) P(TX \mid S_{j_{m-1}}, \ldots, S_{j_1})}{\text{NORMALIZATION}}$$

for m=1, . . . ,N, where $P(TX'_k)$ is a prior probability of a true cross;

and a step of estimation of target types in a tracking system, using discrete information from measurements, said target type estimation step operating in a target type system comprising a number $N_T$ of target types and a number $N_M$ of measurement outcomes, where each target type has a relation to at least one of said measurement outcomes and where each measurement outcome has a relation to at least one of said target types, said target type estimation step comprises an update step including a time recursive calculation of target type probabilities, comprising the steps of:

calculating probabilities ($P(t_q, T_i \mid Z(t_{q-1}))$) at a certain time ($t_q$) that a track is of said target type ($T_i$, i=1, . . . ,$N_T$), using measurements ($Z(t_{q-1})$) at a previous time ($t_{q-1}$);

calculating the likelihood ($P(t_q, z(t_q) \mid T_i, Z(t_{q-1}))$) for a certain measurement ($z(t_q)$) given the target type and the measurements up to said previous time;

calculating probabilities ($P(t_q, T_i \mid Z(t_q))$) that a track is of said target type at the present time from said probabilities ($P(t_q, T_i \mid Z(t_{q-1}))$) that a track is of said target type at a previous time ($t_{q-1}$) and said likelihood ($P(t_q, z(t_q) \mid T_i, Z(t_{q-1}))$);

approximating said likelihood ($P(t_q, z(t_q) \mid T_i, Z(t_{q-1}))$) from a reduced number of parameters; and restoring ambiguity in said likelihood approximation in cases where at least two target types have relations to a different number of measurement outcomes and at least one measurement outcome has a relation to at least two of said target types.

43. A system for target tracking according to claim 42, characterised by a step of calculating the goodness of fit between discrete target type related measurements ($z(t_q)$) and related estimated target type probabilities, said step of calculating the goodness of fit comprises the step of calculating a discrete probability measurement function ($f_D(t_q, p, n)$), where p refers a particular measurement and n to a particular track, where $$f_D(t_q, p, n) = P(t_q, z^p(t_q) \mid \{T_1^n \vee \ldots \vee T_{N_T}^n\}, Z^n(t_{q-1})),$$

said step of calculating said discrete probability measurement function ($f_D(t_q, p, n)$) comprises the step of approximating said discrete probability measurement function ($f_D(t_q, p, n)$) from a reduced number of measurements.

* * * * *

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 20,
Line 65, now reading: "that are ail produced by different sensors $T_i^X$ is here"

should be: -- that are all produced by different sensors.

$T_i^X$ is here --

Column 21,
Lines 13-18,
now reading:

$$P(S_{j_1},\ldots,S_{j_N} \mid T_i^x) = \frac{P(S_{j_1},\ldots,S_{j_N} \mid T_i^x)}{P(T_i^x)},$$

$$= \frac{P(S_{j_1}, T_i^x, S_{j_1}, T_i^x, \ldots, S_{j_N}, T_i^x)}{P(T_i^x)},$$

$$i = 1, \ldots, N_T.$$

should read --

$$P(S_{j_1},\ldots,S_{j_N} \mid T_i^x) = \frac{P(S_{j_1},\ldots,S_{j_N}, T_i^x)}{P(T_i^x)},$$

$$= \frac{P(S_{j_1}, T_i^x, S_{j_1}, T_i^x, \ldots, S_{j_N}, T_i^x)}{P(T_i^x)},$$

$$i = 1, \ldots, N_T.$$

--

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 22,
Line 38,
now reading: $P(TX \mid S_{j1},\ldots,S_{jN})$ should be -- $P(TX|S_{j_1},\ldots,S_{j_N})$ --

Line 42,
now reading: "This quantity can be computed irecursively"
should be: -- This quantity can be computed recursively --

Lines 49-56,
now reading $$= \frac{P(S_{j_1} \mid TX, S_{j_2},\ldots,S_{j_N})P(TX \mid S_{j_2},\ldots,S_{j_N})}{P(S_{j_1} \mid TX, S_{j_2},\ldots,S_{j_N})P(TX \mid S_{j_2},\ldots,S_{j_N}) + P(S_{j_1} \mid \neg TX, S_{j_2},\ldots,S_{j_N})P(\neg TX \mid S_{j_2},\ldots,S_{j_N})}$$

$$= \frac{P(S_{j_1} \mid TX, S_{j_2},\ldots,S_{j_N})P(TX \mid S_{j_2},\ldots,S_{j_N})}{P(S_{j_1} \mid TX, S_{j_2},\ldots,S_{j_N})P(TX \mid S_{j_2},\ldots,S_{j_N}) + P(S_{j_1} \mid \neg TX, S_{j_2},\ldots,S_{j_N})(1 - P(TX \mid S_{j_2},\ldots,S_{j_N}))}$$

UNITED STATES PATENT AND TRADEMARK OFFICE
CERTIFICATE OF CORRECTION

PATENT NO.   : 6,278,401 B1
DATED        : August 21, 2001
INVENTOR(S)  : Wigren It is certified that error appears in the above-identified patent and that said Letters Patent is hereby corrected as shown below:

should be --
$$= P(S_{j_1} | TX, S_{j_2}, \ldots, S_{j_N}) P(TX | S_{j_2}, \ldots, S_{j_N}) / \begin{pmatrix} P(S_{j_1} | TX, S_{j_2}, \ldots, S_{j_N}) P(TX | S_{j_2}, \ldots, S_{j_N}) + \\ P(S_{j_1} | \neg TX, S_{j_2}, \ldots, S_{j_N}) P(\neg TX | S_{j_2}, \ldots, S_{j_N}) \end{pmatrix}$$

$$= P(S_{j_1} | TX, S_{j_2}, \ldots, S_{j_N}) P(TX | S_{j_2}, \ldots, S_{j_N}) / \begin{pmatrix} P(S_{j_1} | TX, S_{j_2}, \ldots, S_{j_N}) P(TX | S_{j_2}, \ldots, S_{j_N}) + \\ P(S_{j_1} | \neg TX, S_{j_2}, \ldots, S_{j_N}) (1 - P(TX | S_{j_2}, \ldots, S_{j_N})) \end{pmatrix}$$

--

Column 22,
Lines 64 and 66,
now reading:
$$P(S_{j1} | TX, S_{j2}, \ldots, S_{jN})$$
$$P(S_{j1} | \neg TX, S_{j2}, \ldots, S_{jN})$$

should be --
$$P(S_{j_1} | TX, S_{j_2}, \ldots, S_{j_N})$$
$$P(S_{j_1} | \neg TX, S_{j_2}, \ldots, S_{j_N})$$
--

Column 23,
Line 4,
now reading:
$$P(S_{j1} | TX, S_{j2}, \ldots, S_{jN}) \approx P(S_{j1} | TX)$$

should be --
$$P(S_{j_1} | TX, S_{j_2}, \ldots, S_{j_N}) \approx P(S_{j_1} | TX)$$
--

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 23,
Lines 7 and 53,
now reading: $S_{j1}$ should be -- $S_{j_1}$ --

Line 38,
now reading: $P(S_{j1} | \neg TX, S_{j2}, \ldots, S_{jN}) \approx P(S_{j1} | \neg TX)$ should be -- $P(S_{j_1} | \neg TX, S_{j_2}, \ldots, S_{j_N}) \approx P(S_{j_1} | \neg TX)$ --

Line 49,
now reading: $P(S_{j1} | \neg TX) = P(S_{j1} | TX_1' \vee TX_2' \vee \ldots \vee TX_M' \vee TX_M' \vee TS)$ should be -- $P(S_{j_1} | \neg TX) = P(S_{j_1} | TX_1' \vee TX_2' \vee \ldots \vee TX_M' \vee TS)$ --

Line 51,
The sentence beginning with "where" should not be indented as a new paragraph.

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 23,
Lines 58-67,
now reading:

$$P(S_{j_1} | \neg TX) = P(S_{j_1} | TX_1' \vee \ldots \vee TX_M' \vee TS)$$

$$= \frac{P \sum_{k=1}^{M} P(S_{j_1} | TX_k') P(TX_k') + P(S_{j_1} | TS) P(TS)}{\sum_{k=1}^{M} P(TX_k') + P(TS)}$$

should be --

$$P(S_{j_1} | \neg TX) = P(S_{j_1} | TX_1' \vee \ldots \vee TX_M' \vee TS)$$

$$= \frac{P \left( \sum_{k=1}^{M} P(S_{j_1} | TX_k') P(TX_k') + P(S_{j_1} | TS) P(TS) \right)}{\sum_{k=1}^{M} P(TX_k') + P(TS)}$$

--

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 24,
Line 11,
now reading: $P(S_{j1}|TX_k')$ and $P(S_{j1}|TS)$ should be -- $P(S_{j_1}|TX_k')$ and $P(S_{j_1}|TS)$ --

Lines 26 and 33,
now reading: $S_{j1}$ should be -- $S_{j_1}$ --

Line 27,
now reading: $P(TX|S_{j2},...,S_{jN})$ should be -- $P(TX|S_{j_2},...,S_{j_N})$ --

Line 36,
now reading: $P(S_{j1}|TX,S_{j2},...,S_{jN})$ should be -- $P(S_{j_1}|TX,S_{j_2},...,S_{j_N})$ --

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 24,
Line 37,
now reading:

$$P\!\left(S_{j1} \mid TX_k'\right), k = 1, \ldots, M$$

should be -- $P\!\left(S_{j_1} \mid TX_k'\right), k = 1, \ldots, M$ --

Line 38,
now reading:

$$P\!\left(S_{j1} \mid \neg TX, S_{j2}, \ldots, S_{jN}\right)$$

should be -- $P\!\left(S_{j_1} \mid \neg TX, S_{j_2}, \ldots, S_{j_N}\right)$ --

Line 40,
now reading:

$$P\!\left(TX \mid S_{j1}, \ldots, S_{jN}\right)$$

should be -- $P\!\left(TX \mid S_{j_1}, \ldots, S_{j_N}\right)$ --

Line 44,
now reading: "has been described Since the"
should be -- has been described. Since the --

Line 56,
now reading:

$$P_Q\!\left(TX \mid S_{j1}, \ldots, S_{jN}\right)$$

should be -- $P_Q\!\left(TX \mid S_{j_1}, \ldots, S_{j_N}\right)$ --

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 24,
Line 63,
now reading:

$$P\left(S_{j_m} \mid TX, S_{j_{m-1}}, \ldots, S_{j_1}\right) = \sum_{i=1}^{N_T} P\left(S_{j_m} \mid T_i^X\right)\left(T_i^X\right)$$

should be --

$$P\left(S_{j_m} \mid TX, S_{j_{m-1}}, \ldots, S_{j_1}\right) = \sum_{i=1}^{N_T} P\left(S_{j_m} \mid T_i^X\right) P\left(T_i^X\right)$$

--

Line 66,
now reading: $S_{jm}$ should be -- $S_{j_m}$ --

Column 25,
Line 3,
now reading:

$$P\left(S_{j_m} \mid TX_k'\right) = \sum_{i=1}^{N_T} P\left(S_{j_m} \mid T_i^{X_k'}\right)\left(T_i^{X_k'}\right)$$

should be --

$$P\left(S_{j_m} \mid TX_k'\right) = \sum_{i=1}^{N_T} P\left(S_{j_m} \mid T_i^{X_k'}\right) P\left(T_i^{X_k'}\right)$$

--

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 25,
Lines 19-22,
now reading:

$$P_Q(TX \mid S_{j_m}, \ldots, S_{j_1}) = \frac{P(S_{j_m} \mid TX, S_{j_{m-1}}, \ldots, S_{j_1})}{P(TX \mid S_{j_{m-1}}, \ldots, S_{j_1})}$$
$$\text{NORMALIZATION}$$

should be --

$$P_Q(TX \mid S_{j_m}, \ldots, S_{j_1}) = P(S_{j_m} \mid TX, S_{j_{m-1}}, \ldots, S_{j_1})$$
$$\frac{P(TX \mid S_{j_{m-1}}, \ldots, S_{j_1})}{\text{NORMALIZATION}}$$
--

Column 26,
Line 43,
now reading: $P(TX \mid S_{j1}, S_{j2})$ should read -- $P(TX \mid S_{j_1}, S_{j_2})$ --

Column 27,
Line 22,
now reading: $\{A_n\}_{n=1}^{N}$ should be -- $\{A_n\}_{n=1}^{N}$ --

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 27,
Lines 44-46,
now reading:

$$= P\bigl(t_q, z^P(t_q) \mid \{T_1'' \vee \ldots \vee T_{N_T}''\} z''(t_{q-1}), Z''(t_{q-2})\bigr) \times$$

$$P\bigl(t_q, z^P(t_{q-1}) \mid \{T_1'' \vee \ldots \vee T_{N_T}''\} Z''(t_{q-2})\bigr) \times$$

should be --

$$= P\bigl(t_q, z^P(t_q) \mid \{T_1'' \vee \ldots \vee T_{N_T}''\} z''(t_{q-1}), Z''(t_{q-2})\bigr) \times$$

$$P\bigl(t_q, z''(t_{q-1}) \mid \{T_1'' \vee \ldots \vee T_{N_T}''\} Z''(t_{q-2})\bigr) \times$$

--

Column 27,
Lines 61-62,
now reading:

$$f_D(t_q, p, n) \approx \frac{P\bigl(t_q, z^P(t_q), \{T_1'' \vee \ldots T_{N_T}''\} z''(t_{q-1}), Z''(t_{q-2})\bigr)}{P\bigl(t_q, \{T_1'' \vee \ldots T_{N_T}''\} z''(t_{q-1}), Z''(t_{q-2})\bigr)} \times$$

$$\frac{P\bigl(t_q, z^P(t_{q-1}), \{T_1'' \vee \ldots T_{N_T}''\} Z''(t_{q-2})\bigr)}{P\bigl(t_q, \{T_1'' \vee \ldots T_{N_T}''\} Z''(t_{q-2})\bigr)}$$

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 27,
Lines 61-62
should be --

$$f_D(t_q,p,n) \approx \frac{P\!\left(t_q,z^p(t_q),\{T_1^n \vee \ldots T_{N_T}^n\}z''(t_{q-1}),Z''(t_{q-2})\right)}{P\!\left(t_q,\{T_1^n \vee \ldots T_{N_T}^n\}z''(t_{q-1}),Z''(t_{q-2})\right)} \times$$

$$\frac{P\!\left(t_q,z''(t_{q-1}),\{T_1^n \vee \ldots T_{N_T}^n\}Z''(t_{q-2})\right)}{P\!\left(t_q,\{T_1^n \vee \ldots T_{N_T}^n\}Z''(t_{q-2})\right)} \quad --$$

Column 28,
Lines 3-18,
now reading:

$$= \frac{\sum_{i_1=1}^{N_T} P(t_q,z^p(t_q) \mid T_{i_1}'',z''(t_{q-1}),Z''(t_{q-1})) \; P(t_q,z^p(t_{q-1}) \mid T_{i_1}'',Z''(t_{q-1})) \; P(t_q,T_{i_1}'' \mid Z''(t_{q-1}))P(Z''(t_{q-1}))}{\sum_{i_1=1}^{N_T} P(t_q,T_{i_1}'' \mid Z''(t_{q-1}))P(Z''(t_{q-1}))}$$

$$= \frac{\sum_{i_1=1}^{N_T} P(t_q,z^p(t_q) \mid T_{i_1}'',z''(t_{q-1}),Z''(t_{q-1})) \; P(t_q,z^p(t_{q-1}) \mid T_{i_1}'',Z''(t_{q-1})) \; P(t_q,T_{i_1}'' \mid Z''(t_{q-1}))}{\sum_{i_1=1}^{N_T} P(t_q,T_{i_1}'' \mid Z''(t_{q-1}))}$$

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 28,
Lines 3-18,
should be --

$$\sum_{i_1=1}^{N_T} P(t_q, z^p(t_q) \mid T_{i_1}'', z''(t_{q-1}), Z''(t_{q-1}))$$

$$P(t_q, z''(t_{q-1}) \mid T_{i_1}'', Z''(t_{q-1}))$$

$$= \frac{P(t_q, T_{i_1}'' \mid Z''(t_{q-1})) P(Z''(t_{q-1}))}{\sum_{i_1=1}^{N_T} P(t_q, T_{i_1}'' \mid Z''(t_{q-1})) P(Z''(t_{q-1}))}$$

$$\sum_{i_1=1}^{N_T} P(t_q, z^p(t_q) \mid T_{i_1}'', z''(t_{q-1}), Z''(t_{q-1}))$$

$$P(t_q, z''(t_{q-1}) \mid T_{i_1}'', Z''(t_{q-1}))$$

$$= \frac{P(t_q, T_{i_1}'' \mid Z''(t_{q-1}))}{\sum_{i_1=1}^{N_T} P(t_q, T_{i_1}'' \mid Z''(t_{q-1}))}$$

Line 27,
now reading:

$$z^p(t_q) = M_q^{\ p}, \quad z''(t_{q-1}) = M_{q-1}^{\ n}.$$

$$z^p(t_q) = M_q^p, \quad z''(t_{q-1}) = M_{q-1}''.$$

UNITED STATES PATENT AND TRADEMARK OFFICE
CERTIFICATE OF CORRECTION

PATENT NO. : 6,278,401 B1  
DATED : August 21, 2001  
INVENTOR(S) : Wigren

Page 13 of 24

It is certified that error appears in the above-identified patent and that said Letters Patent is hereby corrected as shown below:

Column 28,
Line 29,
now reading: "This givens the following final result"
should be -- This gives the following final result --

Line 51,
now reading:
$$(P(t_q, z(t_q) \mid T_I, Z(t_{q-1})))$$

should be -- $(P(t_q, z(t_q) \mid T_i, Z(t_{q-1})))$ --

Column 29,
Lines 4-5,
now reading:
$$(P(t_q, T_1 \mid Z(t_q)))$$

should be -- $(P(t_q, T_i \mid Z(t_q)))$ --

Line 16,
now reading:
$$p(t_0, T_i \mid Z(t_0)) = P_i^0$$

should be -- $P(t_0, T_i \mid Z(t_0)) = P_i^0$ --

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 29,
Lines 61 and 66,
now reading: $P_1$ should be -- $P_I$ --

Column 30,
Line 15,
now reading: $(P_C, P_E, P_1)$ should read -- $(P_C, P_E, P_I)$ --

Line 20,
now reading:
$$(P(t_q, z(t_q) | T_i, Z(t_{q-1})) = (P(t_q, M_q | T_i, M_{q-1})(P(t_q, M_{q-1} | T_i)$$

should be --
$$P(t_q, z(t_q) | T_i, Z(t_{q-1})) = P(t_q, M_q | T_i, M_{q-1}) P(t_q, M_{q-1} | T_i)$$
--

Line 26,
now reading:
$$P(t_q, M_{q-1} | T_i) = P_E + (P_1 - P_E) \cdot \Delta_{iM_{q-1}}^{TM}$$

should read --
$$P(t_q, M_{q-1} | T_i) = P_E + (P_I - P_E) \cdot \Delta_{iM_{q-1}}^{TM}$$
--

UNITED STATES PATENT AND TRADEMARK OFFICE
CERTIFICATE OF CORRECTION

PATENT NO.   : 6,278,401 B1
DATED        : August 21, 2001
INVENTOR(S)  : Wigren It is certified that error appears in the above-identified patent and that said Letters Patent is hereby corrected as shown below:

Column 30,
Line 33,
now reading:
$$P(t_q, M_q | T_i, M_{q-1}) = (P_C - P_E) \cdot \delta_{M_q M_{q-1}} \cdot \Delta_{iM_q}{}^{TM} \cdot \Delta_{iM_{q-1}}{}^{TM} + P_I \cdot \Delta_{iM_q}{}^{TM} \cdot (1 - \Delta_{iM_{q-1}}{}^{TM}) + + P_E (\Delta_{iM_{q-1}}{}^{TM} + (1 - \Delta_{iM_q}{}^{TM}) \cdot (1 - \Delta_{iM_{q-1}}{}^{TM}))$$

should be --
$$P(t_q, M_q | T_i, M_{q-1}) = (P_C - P_E) \cdot \delta_{M_q M_{q-1}} \cdot \Delta_{iM_q}^{TM} \cdot \Delta_{iM_{q-1}}^{TM} + P_I \cdot \Delta_{iM_q}^{TM} \cdot (1 - \Delta_{iM_{q-1}}^{TM}) + P_E (\Delta_{iM_{q-1}}^{TM} + (1 - \Delta_{iM_q}^{TM}) \cdot (1 - \Delta_{iM_{q-1}}^{TM}))$$
--

Line 66,
now reading:
$$P(t_q, T_i | Z(t_{q-1})) = P_i^0 + \left( P(t_{q-1}, T_i | Z(t_{q-1})) - P_i^0 \right) e^{-(t_q - t_{q-1})/\tau}$$

should be --
$$P(t_q, T_i | Z(t_{q-1})) = P_i^0 + \left( P(t_{q-1}, T_i | Z(t_{q-1})) - P_i^0 \right) e^{-(t_q - t_{q-1})/\tau}$$
--

Column 31,
Lines 51, 55, 59 and 64,
now reaiding:    $M_q{}^p$ should be --    $M_q^p$    --

UNITED STATES PATENT AND TRADEMARK OFFICE
CERTIFICATE OF CORRECTION

PATENT NO.   : 6,278,401 B1
DATED        : August 21, 2001
INVENTOR(S)  : Wigren It is certified that error appears in the above-identified patent and that said Letters Patent is hereby corrected as shown below:

Column 31,
Lines 51, 54, 56, 58, 62 and 66,
now reading: $M_{q-1}{}^p$ should be -- $M^p_{q-1}$ --

Lines 60 and 65,
now reading: $P_1$ should be -- $P_l$ --

Column 32,
Line 1,
now reading: $M_{q-1}{}^p$ should read -- $M^p_{q-1}$ --

Lines 22-23,
now reading: $(f_D (t_q, p, n))$ should be -- $(f_D(t_q, p, n))$ --

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 32,
Line 54,
now reading: .· should be -- ·. --

Column 33,
Line 50,
now reading: $(T_1, i = 1,\ldots,N_T)$ should be -- $(T_i, i = 1,\ldots,N_T)$ --

Line 52,
now reading: $(P(t_q, z(t_q) | T_1, Z(t_{q-1})))$ should be -- $(P(t_q, z(t_q) | T_i, Z(t_{q-1})))$ --

Line 55,
now reading: $(P(t_q, T_i | Z(t_{q-1})))$ should be -- $(P(t_q, T_i | Z(t_q)))$ --

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 33,
Line 57,
now reading: $(P(t_q, T_1 \mid Z(t_{q-1})))$ should be -- $(P(t_q, T_i \mid Z(t_{q-1})))$ --

Line 58-59,
now reading: $\overline{(P(t_q, z(t_q) \mid \overline{T_i}, Z(t_{q-1})))}$ should be -- $(P(t_q, z(t_q) \mid T_i, Z(t_{q-1})))$ --

Column 34,
Line 3,
now reading: $(P(T_i^X \mid S_{j1}, \ldots, S_{jN})), i = 1, \ldots, N_T)$ should be -- $(P(T_i^X \mid S_{j_1}, \ldots, S_{j_N})), i = 1, \ldots, N_T)$ --

Line 4,
now reading: $(S_{j1}, \ldots, S_{jN})$ should be -- $(S_{j_1}, \ldots, S_{j_N})$ --

UNITED STATES PATENT AND TRADEMARK OFFICE
CERTIFICATE OF CORRECTION

PATENT NO.    : 6,278,401 B1
DATED         : August 21, 2001
INVENTOR(S)   : Wigren It is certified that error appears in the above-identified patent and that said Letters Patent is hereby corrected as shown below:

Column 34,
Line 17,
now reading: $(P(S_{jk)|Ti}{}^{X})$ should be -- $P(S_{j_k} | T_i^X)$ --

Line 18,
now reading: $(P(T_i^X))$ should be -- $P(T_i^X)$ --

Line 26,
now reading: $(P(TX | S_{j1},...,S_{jN}))$ should be -- $(P(TX | S_{j_1},...,S_{j_N}))$ --

Line 31-35,
now reading:

$$P(TX | S_{j_1},...,S_{j_N}) = \frac{P(S_{j_1} | TX, S_{j_2},...,S_{j_N}) P(TX | S_{j_2},...,S_{j_N})}{P(S_{j_1} | TX, S_{j_2},...,S_{j_N}) P(TX | S_{j_2},...,S_{j_N}) +}$$

$$P(S_{j_1} | \neg TX, S_{j_2},...,S_{j_N})(1 - P(TX | S_{j_2},...,S_{j_N}))$$

should be:

$$P(TX | S_{j_1},...,S_{j_N}) = P(S_{j_1} | TX, S_{j_2},...,S_{j_N}) P(TX | S_{j_2},...,S_{j_N}) / \left( \begin{array}{l} P(S_{j_1} | TX, S_{j_2},...,S_{j_N}) P(TX | S_{j_2},...,S_{j_N}) + \\ P(S_{j_1} | \neg TX, S_{j_2},...,S_{j_N})(1 - P(TX | S_{j_2},...,S_{j_N})) \end{array} \right)$$

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 34,
Line 42,
now reading: $P(S_{j1} | \bar{TX}, S_{j2}, \ldots, S_{jN}) = P(S_{j1} | TX$ should be -- $P(S_{j_1} | TX, S_{j_2}, \ldots, S_{j_N}) = P(S_{j_1} | TX)$ --

Line 44,
now reading: $P(S_{j1} | \neg TX, S_{j2}, \ldots, S_{jN}) = P(S_{j1} | \neg TX)$ should be -- $P(S_{j_1} | \neg TX, S_{j_2}, \ldots, S_{j_N}) = P(S_{j_1} | \neg TX)$ --

Line 55,
now reading:
$$P(S_{j_m} | \neg TX, S_{j_{m-1}}, \ldots, S_{j_1}) = \frac{\sum_{k=1}^{M} P(S_{j_m} | TX'_k)P(TX'_k) + P(S_{j_m} | TS_{j_m})P(TS_{j_m})}{\sum_{k=1}^{M} P(TX'_k) + P(TS_{j_m})}$$

should read --
$$P(S_{j_m} | \neg TX, S_{j_{m-1}}, \ldots, S_{j_1}) = \frac{\sum_{k=1}^{M} P(S_{j_m} | TX'_k)P(TX'_k) + P(S_{j_m} | TS_{j_m})P(TS_{j_m})}{\sum_{k=1}^{M} P(TX'_k) + P(TS_{j_m})}$$
--

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 35,
Lines 8-12, now reading:

calculating $NORMALIZATION = P(S_{j_m} | TX, S_{j_{m-1}}, \ldots, S_{j_1})$
$$P(TX | S_{j_{m-1}}, \ldots, S_{j_1}) +$$
$$P(S_{j_m} | \neg TX, S_{j_{m-1}}, \ldots, S_{j_1})$$
$$(1 - P(TX | S_{j_{m-1}}, \ldots, S_{j_1}))$$

should be:

calculating $NORMALIZATION =$
$$P(S_{j_m} | TX, S_{j_{m-1}}, \ldots, S_{j_1}) P(TX | S_{j_{m-1}}, \ldots, S_{j_1})$$
$$+ P(S_{j_m} | \neg TX, S_{j_{m-1}}, \ldots, S_{j_1})(1 - P(TX | S_{j_{m-1}}, \ldots, S_{j_1}))$$

Lines 13-15,
now reading:

$$P_Q(TX | S_{j_m}, \ldots, S_{j_1}) = \frac{P(S_{j_m} | TX, S_{j_{m-1}}, \ldots, S_{j_1}) P(TX | S_{j_{m-1}}, \ldots, S_{j_1})}{NORMALIZATION}$$

should be:

$$P_Q(TX | S_{j_m}, \ldots, S_{j_1}) =$$
$$= \frac{P(S_{j_m} | TX, S_{j_{m-1}}, \ldots, S_{j_1}) P(TX | S_{j_{m-1}}, \ldots, S_{j_1})}{NORMALIZATION}$$

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 35,
Lines 24-25,
now reading: $P(T_i^N | S_{j1},\ldots, S_{jN}), \quad i=1,\ldots,N_T)$ should read -- $(P(T_i^X | S_{j_1},\ldots,S_{j_N}), \quad i=1,\ldots,N_T)$ --

Line 26,
now reading: $S_{j1},\ldots,S_{jN})$ should be -- $(S_{j_1},\ldots,S_{j_N})$ --

Lines 41-42,
now reading: $k=1, \ldots,N$ should be -- $k=1,\ldots,N$ --

Line 43,
now reading: $(P_Q(TX | S_{j1},\ldots,S_{jN}))$ should be -- $(P_Q(TX | S_{j_1},\ldots,S_{j_N}))$ --

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 35,
Lines 54-55
now reading: $(P_Q(TX \mid S_{j1},\ldots,S_{jN}))$ should be -- $(P_Q(TX \mid S_{j_1},\ldots,S_{j_N}))$ --

Column 36,
Lines 41-42
now reading: $(P(t_q, z(t_q) \mid T_i, Z(t_{q-1})))$ should be -- $(P(t_q, z(t_q) \mid T_i, Z(t_{q-1})))$ --

Lines 56-57,
now reading: $(f_D(t_q, p, n))$ should be -- $(f_D(t_q, p, n))$ --

UNITED STATES PATENT AND TRADEMARK OFFICE
CERTIFICATE OF CORRECTION

PATENT NO. : 6,278,401 B1
DATED : August 21, 2001
INVENTOR(S) : Wigren

It is certified that error appears in the above-identified patent and that said Letters Patent is hereby corrected as shown below:

Column 36,
Lines 63-64,
now reading: $(f_D(t_q, p, n))$ should be -- $(f_D(t_q, p, n))$ --

Signed and Sealed this

Thirtieth Day of April, 2002

*Attest:*

*Attesting Officer*

JAMES E. ROGAN
*Director of the United States Patent and Trademark Office*